US008293295B2

(12) United States Patent
Andersen et al.

(10) Patent No.: US 8,293,295 B2
(45) Date of Patent: *Oct. 23, 2012

(54) CHEWING GUM COMPRISING AT LEAST TWO DIFFERENT BIODEGRADABLE POLYMERS

(75) Inventors: Lone Andersen, Middelfart (DK); Helle Wittorff, Vejle Øst (DK)

(73) Assignee: Gumlink A/S (DK)

( * ) Notice: Subject to any disclaimer, the term of this patent is extended or adjusted under 35 U.S.C. 154(b) by 1051 days.

This patent is subject to a terminal disclaimer.

(21) Appl. No.: 10/528,926

(22) PCT Filed: Sep. 24, 2002

(86) PCT No.: PCT/DK02/00627
§ 371 (c)(1),
(2), (4) Date: Dec. 16, 2005

(87) PCT Pub. No.: WO2004/028268
PCT Pub. Date: Apr. 8, 2004

(65) Prior Publication Data
US 2006/0240143 A1   Oct. 26, 2006

(51) Int. Cl.
*A23G 4/08* (2006.01)
(52) U.S. Cl. .................................. 426/3; 426/6
(58) Field of Classification Search .............. 426/3, 6
See application file for complete search history.

(56) References Cited

U.S. PATENT DOCUMENTS

| | | |
|---|---|---|
| 2,007,965 A | 7/1935 | Ellis |
| 2,353,927 A | 10/1942 | Pickett |
| 2,635,964 A | 1/1951 | Hewitt |
| 3,262,784 A | 7/1966 | Bucher |
| 3,440,060 A | 4/1969 | Rife et al. |
| 3,800,006 A | 3/1974 | Katayama et al. |
| 4,057,537 A | 11/1977 | Sinclair |
| 4,329,369 A | 5/1982 | Tezuka |
| 4,525,363 A | 6/1985 | D'Amelia |
| 4,671,967 A | 6/1987 | Patel et al. |
| 4,731,435 A | 3/1988 | Greene et al. |
| 4,753,805 A | 6/1988 | Cherukuri et al. |
| 4,882,168 A | 11/1989 | Casey et al. |
| 5,354,556 A | 10/1994 | Sparks |
| 5,429,827 A | 7/1995 | Song et al. |
| 5,433,960 A * | 7/1995 | Meyers .............................. 426/5 |
| 5,523,098 A | 6/1996 | Synosky et al. |
| 5,530,074 A | 6/1996 | Jarrett et al. |
| 5,610,266 A | 3/1997 | Buchholz |
| 5,672,367 A | 9/1997 | Grijpma et al. |
| 5,866,179 A | 2/1999 | Testa |
| 6,013,287 A | 1/2000 | Bunczek et al. |
| 6,153,231 A | 11/2000 | Li et al. |
| 6,190,773 B1 | 2/2001 | Imamura et al. |
| 6,194,008 B1 | 2/2001 | Li et al. |
| 6,322,806 B1 | 11/2001 | Ream et al. |
| 6,441,126 B1 | 8/2002 | Cook et al. |
| 6,613,363 B1 | 9/2003 | Li |
| 6,733,818 B2 | 5/2004 | Luo |
| 2001/0002998 A1 | 6/2001 | Ream et al. |
| 2004/0115305 A1 | 6/2004 | Andersen et al. |
| 2004/0142066 A1 | 7/2004 | Andersen et al. |
| 2004/0146599 A1 | 7/2004 | Andersen et al. |
| 2004/0156949 A1 | 8/2004 | Andersen et al. |
| 2004/0180111 A1 | 9/2004 | Andersen et al. |
| 2005/0244538 A1 | 11/2005 | Andersen et al. |
| 2006/0051455 A1 | 3/2006 | Andersen et al. |
| 2006/0099300 A1 | 5/2006 | Andersen et al. |
| 2006/0121156 A1 | 6/2006 | Andersen et al. |
| 2006/0147580 A1 | 7/2006 | Nissen et al. |

FOREIGN PATENT DOCUMENTS

| | | |
|---|---|---|
| EP | 0 151 344 | 8/1985 |
| EP | 0 258 780 | 3/1988 |
| EP | 0 415 656 | 3/1991 |
| EP | 0427185 | 5/1991 |
| EP | 0 500 098 | 8/1992 |
| EP | 0 558 965 | 9/1993 |
| EP | 1 066 759 | 1/2001 |
| EP | 0 711 506 | 4/2003 |
| EP | 1 306 013 | 5/2003 |
| EP | 1354908 | 10/2003 |
| EP | 1 545 234 | 7/2008 |
| JP | 08-196214 | 8/1996 |
| JP | 09-047226 | 2/1997 |
| WO | WO 94/11441 | 5/1994 |
| WO | WO 94/14331 | 7/1994 |
| WO | WO 00/19837 | 4/2000 |
| WO | WO 00/25598 | 5/2000 |
| WO | WO 00/35296 | 6/2000 |

(Continued)

OTHER PUBLICATIONS

Manly et al., "Substances Capable of Decreasing the Acid Solubility of Tooth Enamel", J. Dent. Res., 1949, vol. 28, No. 2, pp. 160-171.
Martindale, The Extra Pharmacopoeia, $28^{th}$ Edition, 1982, pp. 547-548.
Food and Drug Administration, CFR, Title 21, Section 172.615 as "Masticatory Substances of Natural Vegetable Origin".
Odian, G., "Principles of Polymerization", $3^{rd}$ Edition, Wiley-Interscience, New York, NY 1991, pp. 17-19.

(Continued)

*Primary Examiner* — Nikki H Dees
(74) *Attorney, Agent, or Firm* — St. Onge Steward Johnston & Reens LLC

(57) ABSTRACT

The invention relates to chewing gum comprising at least two different biodegradable polymers. According to the invention, a chewing gum comprising at least two different biodegradable polymers exhibits an improved texture prior to any adding of for example softeners. It has been realized that the desired chewing gum texture properties, contrary to every expectation and any prior art disclosures, may be actually be obtained when combining biodegradable chewing gum polymers, for example in the gum base or in the final gum.

62 Claims, 14 Drawing Sheets

FOREIGN PATENT DOCUMENTS

| | | |
|---|---|---|
| WO | WO 00/35297 | 6/2000 |
| WO | WO 01/01788 | 1/2001 |
| WO | WO 01/47368 | 6/2001 |
| WO | WO 01/54512 | 8/2001 |
| WO | WO 02/051258 | 7/2002 |
| WO | WO 02/076227 | 10/2002 |
| WO | WO 02/076228 | 10/2002 |
| WO | WO 02/076229 | 10/2002 |
| WO | WO 02/076230 | 10/2002 |
| WO | WO 02/076231 | 10/2002 |
| WO | WO 02/076232 | 10/2002 |
| WO | WO 2004/028265 | 4/2004 |
| WO | WO 2004/028266 | 4/2004 |
| WO | WO 2004/028267 | 4/2004 |
| WO | WO 2004/028269 | 4/2004 |
| WO | WO 2004/028270 | 4/2004 |
| WO | WO 2004/068965 | 4/2004 |
| WO | WO 2004/068964 | 8/2004 |

OTHER PUBLICATIONS

International Search Report; International Application No. PCT/Dk 02/00627; International Search Date May 28, 2003; Date of Mailing Jun. 24, 2003; 3 pgs.
WO0056281 Publication Date May 8, 2002; "Composition for medicated chewing gums process for manufacturing the same and tablets so obtained" (Abstract Only).
J. Dent. Res. vol. 28, No. 2; pp. 160-171; Apr. 1949.
U.S. Appl. No. 10/528,927, filed Dec. 16, 2006; Andersen et al.; "Biodegradable chewing gum comprising at least one high molecular weight biodegradable polymer" (available in IFW).
U.S. Appl. No. 10/529,137, filed Sep. 6, 2005; Andersen et al.; "Gum base" (available in IFW).
Ching, Chauncey, et al.; "Biodegradable Polymers and Packaging", Biodegradable Polymers and Packaging, (1993): p. 28-31.
Grijpma, Dirk W., et al., "(Co)polymers of L-lactide, 1" Macromolecules Chem. Phys. (1993): p. 1633-1647.
JP48-19950; Jun. 18, 1973; Translation (10 pages).
Preliminary Examination Report dated Dec. 20, 2004 for Application No. PCT/DK02/00627.

* cited by examiner

CHEWING GUM COMPRISING AT LEAST TWO DIFFERENT BIODEGRADABLE POLYMERS

FIELD OF THE INVENTION

The invention relates to a chewing gum comprising at least two different biodegradable polymers.

BACKGROUND OF THE INVENTION

Softeners are small-molecular structures typically applied for the purpose of modifying the texture of the elastomer applied in the chewing gum. A problem when applying softeners to biodegradable polymers is that the softener tends to dissolve the polymer before the desired texture is reached It is the object of the invention to provide a chewing gum having certain desired texture without dissolving the overall chewing gum structure when adjusting the texture.

It is a further object of the invention to obtain a completely biodegradable chewing gum having a texture comparable to conventional chewing gum.

According to the prior art, a great significance has been made out of glass transition temperature of chewing gum. Especially, when dealing with biodegradable chewing gum.

The glass transition temperature Tg can loosely be defined as the temperature where a polymer undergoes a significant change in properties. The Tg is where a polymer structure turns "rubbery" upon heating and "glassy" upon cooling. Tg is regarded as a so-called second order transition, i.e. a thermal transition that involves a change in heat capacity, but does not have a latent heat.

According to the prior art within the field of chewing gum, e.g. as disclosed in WO 00/19837 and U.S. Pat. No. 5,672,367 great efforts has been made in obtaining a glass transition temperature of the applied chewing gum below about 37° C. In other words, the user of a chewing gum should be able to change the conditions of a chewing gum from below the glass transition temperature to above the glass transition temperature, when the chewing gum in chewed and in fact heated in the mouth.

On the other hand, as it generally applies to chewing gum and e.g. disclosed in U.S. Pat. No. 5,523,098, the glass transition temperature of the chewing gum should not lay significantly below reasonably expected storage temperature, e.g. 10 degree to 12 degree. C. For this reason a significant effort has been made in order to counteract the expected increase to prevent blocking. Such shipping and storage temperatures are stated to be non-cost-effective. In fact such temperatures may not be possible when shipping in, or to, certain locations. Thus, it is stated in U.S. Pat. No. 5,523,098 that cold flow causes independent gum base pellets or slabs to join or fuse together so that individual slabs or pellets cannot be removed from their container or carton. Pelletized, or slab poured gum base that is stored or shipped at temperatures above its glass transition temperature can deform. Subjected to gravitational forces, these slabs or pellets agglomerate, or mass together, with other pellets or slabs.

This requirement is reflected in both WO 00/19837 and U.S. Pat. No. 5,672,367 where a biodegradable chewing gum is disclosed comprising one single polymer having a relatively high glass temperature.

However, a drawback of the prior art biodegradable chewing gum is that the biodegradable elastomer polymers by nature performs somewhat different than conventional elastomers. According to the prior art, these deviating properties have been dealt with by focusing strictly on keeping the glass transition temperature of the resulting chewing gum below than about 37° C. whereby the desired properties would be obtained.

However, a drawback of the above-described chewing gums is that the final obtainable texture may differ from that of conventional chewing gum.

It is an object of the invention to obtain a biodegradable chewing gum having a texture comparable to conventional chewing gum.

It is an object of the invention to provide both a biodegradable chewing gum that may actually be shipped and distributed under normal or at least substantially conventional chewing gum distribution parameters and on the other hand exhibit an acceptable texture, when applied as a chewing gum.

SUMMARY OF THE INVENTION

The invention relates to chewing gum comprising at least two different biodegradable polymers.

According to the invention, a chewing gum comprising at least two different biodegradable polymers exhibits an improved texture prior to any adding of for example softeners. It has been realized that the desired chewing gum texture properties, contrary to every expectation and any prior art disclosures, may be actually be obtained when combining biodegradable chewing gum polymers, for example in the gum base or in the final gum.

The fact, that biodegradable polymers may actually be configured into a suitable polymer gum base, e.g. at least one biodegradable elastomer and at least one biodegradable synthetic resin substitute, does actually open the possibility of providing a completely biodegradable commercially chewing gum.

According to the invention a chewing gum should preferably comprise different biodegradable polymers in order to enable a uniform or a certain desired release profile over time.

According to the invention, it has been realized that chewing gum made on the basis of biodegradable polymers features an improved release of flavors, active ingredients or for example sweeteners when compared to release in chewing gums made on a conventional basis. Specifically, it has been established that different biodegradable polymers typically result in very different release properties during the complete chewing phase when compared to conventional chewing gum Moreover, according to the invention, it has been established that the different release profiles may in fact be sought of super positioned in order to obtain a desired release profile.

In an embodiment of the invention the at least two different polymers are hydrophilic.

It should be noted that the degree of hydrophilic behavior of the polymer might vary quite significantly from polymer to polymer. It is however a general fact, that the biodegradable polymers are more hydrophilic than conventional polymers.

Typical biodegradable polymers are relatively hydrophilic.

In an embodiment of the invention the difference in molecular weight between the at least two different polymers is at least 1000 g/mol Mn In an embodiment of the invention the difference in molecular weight between the at least two different polymers is at least 10000 g/mol Mn In an embodiment of the invention the difference in molecular weight between the at least two different polymers is at least 50000 g/mol Mn When applying relatively significant differences in molecular weight between the applied biodegradable polymers, an increased possibility of tuning with respect to both texture and for instance chewing gum release has been obtained.

In an embodiment of the invention at least one of said at least two different biodegradable polymers comprises a biodegradable elastomer and at least one of said at least two different biodegradable polymers comprises a biodegradable plasticizer, said biodegradable plasticizer comprising at least one biodegradable polymer.

According to the prior art, attempts have been made within the field of biodegradable chewing to provide a chewing gum having texture properties comparable to the texture properties of conventional chewing gum. According to e.g. U.S. Pat. No. 6,153,231, it has been realized that chewing gum made on the basis of biodegradable elastomers should preferably be made on the basis of an elastomer, thereby elimination the annoying tackness established by conventional plasticizers.

According to a preferred embodiment of the invention, it has been realized that it is in fact possible to pair a biodegradable polymer plasticizer with an elastomer without compromising the desire for non-tack. Moreover, it has been realized that improved texture may be obtained by incorporation of biodegradable plasticizers in a chewing gum or the gum base.

Further significant chewing gum characteristics may also be improved compared to conventional biodegradable single or dual elastomer system.

In an embodiment of the invention the molecular weight of said biodegradable plasticizer is in the range of 500-19,000 g/mol, preferably within the range of 1,500-9,000 g/mol Mn.

In an embodiment of the invention said at least two different biodegradable polymers having a different glass transition temperature Tg.

According to the invention, it has been realized that biodegradable chewing gum having a texture comparable to conventional chewing gum may be obtained, when at least two of the applied biodegradable polymers have different glass transition temperature. In other words, the applied biodegradable polymers form a hybrid polymer gumbase or chewing gum having at least two different properties with respect to the glass transitions temperature.

According to the invention, at least one of the applied biodegradable polymers may be applied for counteracting cold floating of the gumbase or the final chewing and at least one of the other may be applied for obtaining desired chewing gum properties with respect to texture.

In other words, according to the invention, it has been realized that the expected requirements with respect to the applied biodegradable polymers of a chewing gum may be significantly loosened when applying more polymers according to the invention.

Hence, according to the invention the important issue of facilitating shipping of the final product with respect to cold floating may even and unexpectedly, be dealt with by means of at least one stabilizing biodegradable polymers, e.g. a biodegradable polymer having a relatively high glass transitions temperature mixed with a further biodegradable polymer featuring another glass temperature than the stabilizing polymers. Typically, the at least one further biodegradable polymer may be chosen by e.g. an elastomer having a relatively low glass transition temperature.

Moreover, according to the invention, it has been realized that biodegradable polymers, when incorporated in a gum base or chewing gum composition reacts somewhat vulnerable compared to conventional polymers and it has moreover been realized that this vulnerability to softeners may be compensated when applying texture improving mixtures of at least two polymers having different glass transition temperature. Hence, the need for structure weakening softeners may be reduced due to the fact, that the texture is improved when compared to single Tg polymer blends of chewing gum.

In an embodiment of the invention said at least two different biodegradable polymers having a different glass transition temperature Tg.

According to the invention, at least one of the applied biodegradable polymers may be applied for counteracting cold floating of the gumbase or the final chewing gum and at least one of the other may be applied for obtaining desired chewing gum properties with respect to texture.

The one applied for the purpose of counteracting floating should preferably be relatively high, whereas the other, providing the advantageous texture, should preferably be relatively low, typically substantially lower than room temperature.

In an embodiment of the invention at least one of the applied biodegradable polymers, preferably a plasticizer, has a glass transition of at least +1° C.

In an embodiment of the invention at least one of the applied biodegradable polymers, preferably a plasticizer, has a glass transition of at least +10° C.

In an embodiment of the invention at least one of the applied biodegradable polymers, preferably a plasticizer, has a glass transition of at least +20° C.

In an embodiment of the invention at least one of the applied biodegradable polymers comprises a biodegradable elastomer.

In an embodiment of the invention the molecular weight of said a biodegradable elastomer range of 10000-1000000 g/mol Mn, preferably within the range of 30000-250000 g/mol Mn.

According to a preferred embodiment of the invention, at least one of the applied polymers has an Mn of at least 100000 g/mol.

In an embodiment of the invention at least one of the at least two different biodegradable polymers has a glass transition temperature of less than 0° C.

In an embodiment of the invention at least one of the at least two different biodegradable polymers has a glass transition temperature of less than −30° C., preferably less than −50° C.

In an embodiment of the invention at least two different biodegradable polymers and wherein the resulting chewing gum has at least two different glass transitions temperatures Tg.

According to the invention, it has been realized that the desired texture properties may be obtained when the mixed chewing gum elastomer and elastomer solvents comprises at least two different Tg's.

In an embodiment of the invention the chewing gum comprises at least one biodegradable elastomer having a glass transition temperature Tg below 0° C. and at least one biodegradable plasticizer having a glass transition temperature Tg exceeding 0° C.

In an embodiment of the invention at least one plasticizer comprises at biodegradable polymer obtained by polymerization of one or more cyclic esters.

In an embodiment of the invention the at least one elastomer comprises at biodegradable polymer obtained by polymerization of one or more cyclic esters.

In an embodiment of the invention the at least one elastomer comprises edible polyesters.

In an embodiment of the invention the at least one elastomer comprises edible polyesters polyhydroxyalkanoates In an embodiment of the invention said chewing gum ingredients comprise flavoring agents.

In an embodiment of the invention said flavoring agents comprise natural and synthetic flavorings in the form of natural vegetable components, essential oils, essences, extracts, powders, including acids and other substances capable of affecting the taste profile In an embodiment of the invention said chewing gum comprises flavor in an amount of 0.01 to about 30 wt %, said percentage being based on the total weight of the chewing gum In an embodiment of the invention said chewing gum comprises flavor in an amount of 0.2 to about 4 wt %, said percentage being based on the total weight of the chewing gum In an embodiment of the invention said flavor comprises water-soluble ingredients.

In an embodiment of the invention said water-soluble flavor comprises acids.

According to the invention, a surprising initial release of acids has been obtained.

In an embodiment of the invention said flavor comprising water insoluble ingredients.

In an embodiment of the invention, said chewing gum ingredients comprising sweeteners.

In an embodiment of the invention said sweetener comprises bulk sweeteners

In an embodiment of the invention the chewing gum comprises bulk sweeteners in an amount of about 5 to about 95% by weight of the chewing gum, more typically about 20 to about 80% by weight of the chewing gum.

In an embodiment of the invention the sweetener comprises high intensity sweeteners In an embodiment of the invention the high intensity sweeteners comprises sucralose, aspartame, salts of acesulfame, alitame, saccharin and its salts, cyclamic acid and its salts, glycyrrhizin, dihydrochalcones, thaumatin, monellin, sterioside, alone or in combination In an embodiment of the invention wherein the chewing gum comprises high intensity sweeteners in an amount of about 0 to about 1% by weight of the chewing gum, more typically about 0.05 to about 0.5% by weight of the chewing gum.

In an embodiment of the invention, the chewing gum comprises at least one softener.

In an embodiment of the invention, the at least one softener comprises tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids—such as stearic, palmitic, oleic and linoleic acids mixtures thereof.

In an embodiment of the invention the chewing gum comprises softeners in an amount of about 0 to about 18% by weight of the chewing gum, more typically about 0 to about 12% by weight of the chewing gum.

In an embodiment of the invention, the chewing gum ingredients comprise active ingredients.

In an embodiment of the invention, said active ingredients are selected from the group of: Acetaminophen, Acetylsalicylic acid, Buprenorphine, Bromhexin, Celcoxib, Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Rofecoxib, Tenoxicam, Tramadol, Valdecoxib, Calciumcarbonat, Magaldrate, Disulfiram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon.Chloride, Benzeth. Chloride, Cetylpyrid. Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Cialis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminium salts, Calcium salts, Ferro salts, Silver salts, Zinc-salte, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminiumaminoacetat, Cimetidine, Esomeprazole, Famotidine, Lansoprazole, Magnesiumoxide, Nizatide and or Ratinidine or derivates and mixtures thereof.

In an embodiment of the invention, the chewing gum is free of non-biodegradable polymers In an embodiment of the invention the at least two ore more cyclic esters are selected from the groups of glycolides, lactides, lactones, cyclic carbonates or mixtures thereof.

In an embodiment of the invention the lactone monomers are chosen from the group of $\epsilon$-caprolactone, $\delta$-valerolactone, $\gamma$-butyrolactone, and $\beta$-propiolactone. It also includes $\epsilon$-caprolactones, $\delta$-valerolactones, $\gamma$-butyrolactones, or $\beta$-propiolactones that have been substituted with one or more alkyl or aryl substituents at any non-carbonyl carbon atoms along the ring, including compounds in which two substituents are contained on the same carbon atom.

In an embodiment of the invention the carbonate monomer is selected from the group of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4,6dimethyl-1, 3-propylene carbonate, 2, 2-dimethyl trimethylene carbonate, and 1, 3-dioxepan-2-one and mixtures thereof.

In an embodiment of the invention the cyclic ester polymers and their copolymers resulting from the polymerization of cyclic ester monomers include, but are not limited to: poly(L-lactide); poly(D-lactide); poly(D, L-lactide); poly (mesolactide); poly(glycolide); poly(trimethylenecarbonate); poly(epsilon-caprolactone); poly (L-lactide-co-D, L-lactide); poly(L-lactide-co-meso-lactide); poly (L-lactide co-glycolide); poly (L-lactide-co-trimethylenecarbonate); poly(L-lactide co-epsilon-caprolactone); poly(D, L-lactide-co-meso-lactide); poly(D, L lactide-co-glycolide); poly (D, L-lactide-co-trimethylenecarbonate); poly(D, L-lactide-co-epsilon-caprolactone); poly(meso-lactide-co glycolide); poly (meso-lactide-co-trimethylenecarbonate); poly(meso lactide-co-epsilon-caprolactone); poly(glycolide-cotrimethylenecarbonate); poly (glycolide-co-epsilon-caprolactone).

In an embodiment of the invention the chewing gum comprises filler.

A chewing gum base formulation may, if desired, include one or more fillers/texturisers including as examples, magnesium and calcium carbonate, sodium sulphate, ground limestone, silicate compounds such as magnesium and aluminium silicate, kaolin and clay, aluminium oxide, silicium oxide, talc, titanium oxide, mono-, di- and tri-calcium phosphates, cellulose polymers, such as wood, and combinations thereof.

In an embodiment of the invention the chewing gum comprises filler in an amount of about 0 to about 50% by weight of the chewing gum, more typically about 10 to about 40% by weight of the chewing gum.

In an embodiment of the invention the chewing gum comprises at least one coloring agent.

According to an embodiment of the invention, the chewing gum may comprise color agents and whiteners such as FD&C-type dyes and lakes, fruit and vegetable extracts, titanium dioxide and combinations thereof. Further useful chewing gum base components include antioxidants, e.g. butylated hydroxytoluene (BHT), butyl hydroxyanisol (BHA), propylgallate and tocopherols, and preservatives.

In an embodiment of the invention the chewing gum is coated with an outer coating.

In an embodiment of the invention the outer coating is a hard coating.

In an embodiment of the invention the hard coating is a coating selected from the group consisting of a sugar coating and a sugarless coating and a combination thereof.

In an embodiment of the invention the hard coating comprises 50 to 100% by weight of a polyol selected from the group consisting of sorbitol, maltitol, mannitol, xylitol, erythritol, lactitol and isomalt.

In an embodiment of the invention the outer coating is an edible film comprising at least one component selected from the group consisting of an edible film-forming agent and a wax.

In an embodiment of the invention the film-forming agent is selected from the group consisting of a cellulose derivative, a modified starch, a dextrin, gelatine, shellac, gum arabic, zein, a vegetable gum, a synthetic polymer and any combination thereof.

In an embodiment of the invention the outer coating comprises at least one additive component selected from the group consisting of a binding agent, a moisture absorbing component, a film forming agent, a dispersing agent, an antisticking component, a bulking agent, a flavoring agent, a coloring agent, a pharmaceutically or cosmetically active component, a lipid component, a wax component, a sugar, an acid and an agent capable of accelerating the after-chewing degradation of the degradable polymer.

In an embodiment of the invention the outer coating is a soft coating.

In an embodiment of the invention the soft coating comprises a sugar free coating agent.

In an embodiment of the invention the chewing gum comprises conventional chewing gum polymers or resins.

In an embodiment of the invention the at least one biodegradable polymer comprises at least 5% of the chewing gum polymers.

In an embodiment of the invention all the biodegradable polymers comprised in the chewing gum comprises at least 25%, preferably at least 50% of the chewing gum polymers.

In an embodiment of the invention the biodegradable polymers comprised in the chewing gum comprises at least 80%, preferably at least 90% of the chewing gum polymers.

According to the invention, a biodegradable polymer according to the invention may form a substitute of a conventional natural or synthetic resin.

According to the invention, a biodegradable polymer according to the invention may form a substitute of a conventional low or high molecular weight elastomer.

In an embodiment of the invention said chewing gum comprises
at least one biodegradable elastomer in the amount of about 0.5 to about 70% wt of the chewing gum,
at least one biodegradable plasticizer in the amount of about 0.5 to about 70% wt of the chewing gum and
at least one chewing gum ingredient chosen from the groups of softeners, sweeteners, flavoring agents, active ingredients and fillers in the amount of about 2 to about 80% wt of the chewing gum.

In an embodiment of the invention edible polyesters may be applied as a degradable chewing gum polymer.

Edible polyesters are obtained by esterification of at least one alcohol and one acid.

The edible polyester is produced by condensation polymerization reaction of at least one alcohol chosen from the group of trihydroxyl alcohol and dihydroxyl alcohol, and at least one acid chosen from the group consisting of dicarboxylic acid and tricarboxylic acid.

It is possible to use edible or food grade materials. Because the starting acids and alcohols are food grade materials the resultant polymers is edible.

Alcohols: Glycerol, propylene glycol, 1,3 butylene diol

Acids: Citric acid, fumaric acid, adipic acid, malic acid, succinic acid, suberic acid, sebacic acid, dodecanedioic acid, glucaric acid, glutamic acid, glutaric, azelaic acid, tartaric acid Edible polyesters can replace both elastomers and elastomer plasticizers and form 1-80% of the gum base.

DRAWINGS

The invention will now be described with reference to the drawings of which

DETAILED DESCRIPTION

Figure 1:
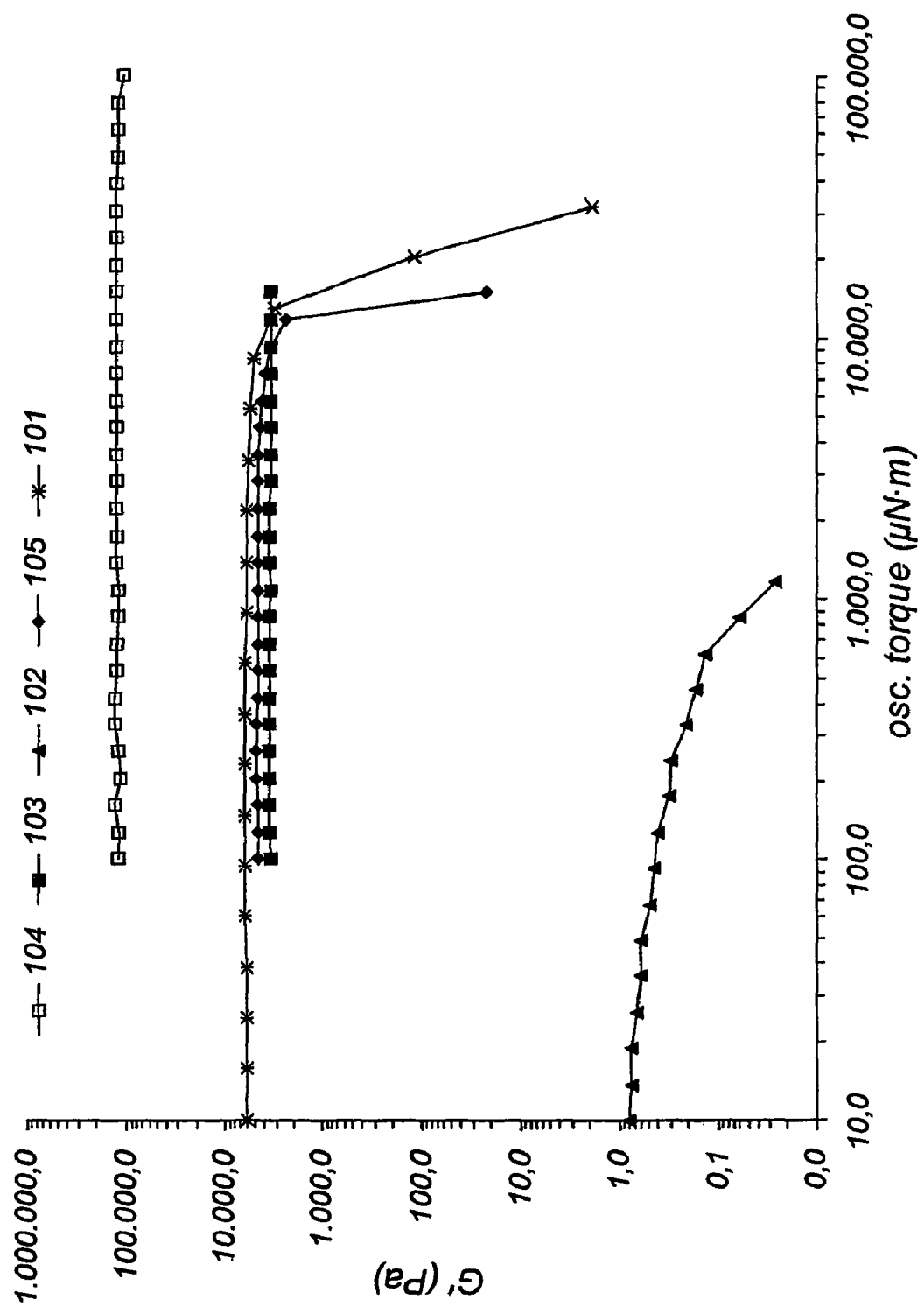
FIG. 1 to 5 illustrate chewing profile.

In the present context the terms environmentally or biologically degradable polymer compounds refers to chewing gum base components which, after dumping the chewing gum, is capable of undergoing a physical, chemical and/or biological degradation whereby the dumped chewing gum waste becomes more readily removable from the site of dumping or is eventually disintegrated to lumps or particles which are no longer recognisable as being chewing gum remnants. The degradation or disintegration of such degradable polymers can be effected or induced by physical factors such as temperature, light, moisture, by chemical factors such as hydrolysis caused by a change in pH or by the action of enzymes capable of degrading the polymers. In other useful embodiments all of the polymer components of the gum base are environmentally degradable or biodegradable polymers.

Preferably, the ultimate degradation products are carbon dioxide, methane and water.

According to a preferred definition of biodegradability according to the invention biodegradability is a property of certain organic molecules whereby, when exposed to the natural environment or placed within a living organism, they react through an enzymatic or microbial process, often in combination with a pure chemical process such as hydrolysis, to form simpler compounds, and ultimately, carbon dioxide, nitrogen oxides, and water.

Accordingly, suitable examples of additional environmentally or biologically degradable chewing gum base polymers which can be applied in accordance with the gum base of the present invention include degradable polyesters, polycarbonates, polyester amides, polypeptides, homopolymers of amino acids such as polylysine, and proteins including derivatives hereof such as e.g. protein hydrolysates including a zein hydrolysate. Particularly useful compounds of this type include polyester polymers obtained by the polymerisation of one or more cyclic esters such as lactide, glycolide, trimethylene carbonate, δ-valerolactone, β-propiolactone and ε-caprolactone. Such degradable polymers may be homopolymers or copolymers, including block-polymers.

Unless otherwise indicated, as used herein, the term "molecular weight" means number average molecular weight (Mn).

The glass transitions temperature may be determined by for example DSC (DSC: differential scanning calorimetry). The DSC may generally be applied for determining and studying of the thermal transitions of a polymer and specifically, the technique may be applied for the determination of a second order transition of a material, i.e. a thermal transition that involves a change en heat capacity, but does not have a latent heat. The glass transition is a second order transition.

EXAMPLE 1

Preparation of Resin

A resin sample was produced using a cylindrical glass, jacketed 10 L pilot reactor equipped with glass stir shaft and Teflon stir blades and bottom outlet. Heating of the reactor contents was accomplished by circulation of silicone oil, thermostated to 130° C., through the outer jacket. D,L-lactide (4.877 kg, 33.84 mol) was charged to the reactor and melted by heating to 140° C. for 6 h. After the D,L-lactide was completely molten, the temperature was reduced to 130° C., and stannous octoate (1.79 g, 4.42×10$^{-3}$ mol), 1,2-propylene glycol (79.87 g, 1.050 mol), and ε-caprolactone (290.76 g, 2.547 mol) were charged to the reactor. After the mixture became homogeneous, stirring was continued for 24 h at 130° C. At the end of this time, the bottom outlet was opened, and molten polymer was allowed to drain into a Teflon-lined paint can.

Characterization of the product indicated $M_n$=5,700 g/mol and $M_w$=7,100 g/mol (gel permeation chromatography with online MALLS detector) and Tg=30.7° C. (DSC, heating rate 10° C./min).

EXAMPLE 2

Preparation of LMWE Elastomer No 1

A LMWE sample was synthesized within a dry $N_2$ glove box, as follows. Into a 500 mL resin kettle equipped with overhead mechanical stirrer, 0.40 g 1,2-propane diol (1.82 mL of a 22.0% (w/v) solution in MeCl$_2$), and 0.094 g Sn(Oct)$_2$ (2.2 mL of a 4.27% (w/v) solution of in MeCl$_2$) were charged under dry $N_2$ gas purge. The MeCl$_2$ was allowed to evaporate under the $N_2$ purge for 15 min. Then ε-caprolactone (170 g, 1.49 mol), TMC (76 g, 0.74 mol), and δ-valerolactone (74 g, 0.74 mol) were added. The resin kettle was submerged in a 130° C. constant-temperature oil bath and stirred for 14 h. Subsequently the kettle was removed from the oil bath and allowed to cool to room temperature. The solid, elastic product was removed in small pieces using a knife, and placed into a plastic container.

Characterization of the product indicated $M_n$=57,960 g/mol and $M_w$=85,910 g/mol (gel permeation chromatography with online MALLS detector) and $T_g$=-59.8° C. (DSC, heating rate 10° C./min).

EXAMPLE 3

Preparation of LMWE Elastomer No 2

A LMWE sample was synthesized within a dry $N_2$ glove box, as follows. Into a 500 mL resin kettle equipped with overhead mechanical stirrer, 0.73 g 1,2-propane diol (3.3 mL of a 22.0% (w/v) solution in methylene chloride), and 0.152 g Sn(Oct)$_2$ (3.56 ml of a 4.27% (w/v) solution in methylene chloride) were charged under dry $N_2$ gas purge. The methylene chloride was allowed to evaporate under the $N_2$ purge for 15 min. Then ε-caprolactone (300 g, 2.63 mol) and δ-valerolactone (215 gm, 2.15 mol) were added. The resin kettle was submerged in a 130° C. constant temperature oil bath and stirred for 14 h. Subsequently the kettle was removed from the oil bath and allowed to cool at room temperature. The solid, elastic product was removed in small pieces using a knife, and placed into a plastic container.

Characterization of the product indicated $M_n$=59,900 g/mol and $M_w$=74,200 g/mol (gel permeation chromatography with online MALLS detector) and $T_g$=-70° C. (DSC, heating rate 10° C./min).

EXAMPLE 4

Preparation of HMWE Elastomer

A HMWE sample according to the invention was synthesized in a dry $N_2$ glove box, as follows. Into a 500 mL resin kettle equipped with overhead mechanical stirrer was charged 0.037 g Sn(Oct)$_2$ (3.4 ml of a 1.10% (w/v) solution in methylene chloride) under dry $N_2$ gas purge. The methylene chloride was allowed to evaporate under the $N_2$ purge for 15 min. Then, pentaerythritol (0.210 g, 1.54×10$^{-3}$ mol), ε-caprolactone (79.0 g, 0.692 mol), TMC(8.0 g, 0.078 mol) and δ-valerolactone (38.0 g, 0.380 mol) were added. The resin kettle was submerged in a 130° C. constant temperature oil bath and stirred for 14 h. Subsequently the kettle was removed from the oil bath and allowed to cool at room temperature. The solid, elastic product was removed in small pieces using a knife, and placed into a plastic container.

Characterization of the product indicated $M_n$=64,600 g/mol and $M_w$=165,200 g/mol (gel permeation chromatography with online MALLS detector) and $T_g$=-66° C. (DSC, heating rate 10° C./min).

EXAMPLE 5

Preparation of Gum Bases

All the gum bases (except for 102-105, which only consist of one polymer) are red with following basic formulation:

| Ingredients | Percent by weight |
| --- | --- |
| Elastomer HMWE | 20 |
| Elastomer LMWE | 40 |
| Resin | 40 |

| No | Type | Elastomer HMWE | Elastomer LMWE | Resin |
|---|---|---|---|---|
| 101 | standard gum base | Polyisobutylene Mn = 73,000 | Polyisobutylene Mn = 30,000 | Polyvinylacetate Mn = 5000 |
| 102 | bio base | — | — | Resin polymer from example 1 |
| 103 | bio base | — | Elastomer polymer from example 2 | |
| 104 | bio base | Elastomer polymer from example 4 | — | — |
| 105 | bio base | Elastomer polymer from example 4 | Elastomer polymer from example 2 | Resin polymer from example 1 |
| 106 | bio base | Elastomer polymer from example 4 | Elastomer polymer from example 3 | Resin polymer from example 1 |

The gum bases (101, 105 and 106) are prepared as follows:

HMWE elastomer is added to a mixing kettle provided with mixing means like e.g. horizontally placed Z-shaped arms. The kettle had been preheated for 15 minutes to a temperature of about 60-80° C. The rubber is broken into small pieces and softened with mechanical action on the kettle.

The resin is slowly added to the elastomer until the mixture becomes homogeneous.

The remaining resin is then added to the kettle and mixed for 10-20 minutes. The LMWE elastomer is added and mixed for 20-40 minutes until the whole mixture becomes homogeneous.

The mixture is then discharged into the pan and allowed to cool to room temperature from the discharged temperature of 60-80° C., or the gumbase mixture is used directly for chewing gum by adding all chewing gum components in an appropriate order under continuous mixing.

EXAMPLE 6

Preparation of Chewing Gum

All chewing gum formulations are prepared with the following basic formulation

Peppermint:

| Ingredients | Percent by weight |
|---|---|
| Gum base | 40 |
| Sorbitol | 48.6 |
| Lycasin | 3 |
| Peppermint oil | 1.5 |
| Menthol crystals | 0.5 |
| Aspartame | 0.2 |
| Acesulfame | 0.2 |
| Xylitol | 6 |

TABLE 2

Peppermint chewing gum

| Chewing gum | Gum base | Ref. |
|---|---|---|
| 1001 | Standard conventional gum base | 101 |
| 1002 | Gum base based only on biodegradable resin | 102 |
| 1003 | Gum base based only on biodegradable LMWE elastomer | 103 |
| 1004 | Gum base based only on biodegradable HMWE elastomer | 104 |
| 1005 | 100% biodegradable chewing gum | 105 |

TABLE 3

Peppermint chewing gum prepared with different softening ingredients

| | | Added | Sensory evaluation | | | | |
|---|---|---|---|---|---|---|---|
| Chewing gum | Gum base | ingredients: | Elastic | Softness 1 | Softness 2 | Volume | Creak |
| 1006 | 106 | bio standard | 4 | ½ | 3 | 3 | 4 |
| 1007 | 106 | 1% wax | 3 | 1 | 3 | 3 | 5 |
| 1008 | 106 | 3% wax | 2 | 1 | 3 | 2 | 1 |
| 1009 | 106 | 1% lecithin | 3 | 2 | 4 | 2 | 3 |
| 1010 | 106 | 3% lecithin | 4 | 3 | 4 | 3 | 2 |
| 1011 | 106 | 3% glycerol | 3 | 4 | 3 | 2 | 5 |
| 1012 | 106 | 5% glycerol | 3 | 4 | 3 | 2 | 5 |
| 1013 | 106 | 1% PGE | 3 | 2 | 3 | 3 | 3 |
| 1014 | 106 | 3% PGE | 4 | 2 | 4 | 4 | 2 |
| 1015 | 106 | 0.5% triacetin | 3 | 3 | 3 | 3 | 4 |
| 1016 | 106 | 1% triacetin | 3 | 2 | 3 | 2 | 4 |
| 1017 | 101 | 1% wax | 5 | 3 | 3 | 3 | 1 |
| 1018 | 101 | 3% wax | 4 | 3 | 3 | 3 | 1 |
| 1019 | 101 | 1% lecithin | 4 | 2 | 3 | 3 | 0 |
| 1020 | 101 | 3% lecithin | 3 | 3 | 3 | 3 | 0 |
| 1021 | 101 | 3% glycerol | 4 | 2 | 3 | 3 | 0 |
| 1022 | 101 | 5% glycerol | 4 | 3 | 3 | 3 | 0 |
| 1023 | 101 | 1% PGE | 4 | 2 | 2 | 3 | 0 |
| 1024 | 101 | 3% PGE | 4 | 2 | 3 | 3 | 0 |
| 1025 | 101 | 0.5% triacetin | 4 | 1 | 2 | 3 | 0 |
| 1026 | 101 | 1% triacetin | 3 | 3 | 3 | 3 | 0 |
| 1027 | 101 | standard | 5 | 2 | 2 | 3 | 1 |
| 1028 | 106 | 2% wax | 4 | 1 | 3 | 4 | 1 |
| 1029 | 106 | 4% wax | 3 | 1 | 4 | 3 | 0 |
| 1030 | 106 | 2% fat | 2 | 1 | 3 | 3 | 4 |
| 1031 | 106 | 3% fat | 2 | 1 | 3 | 3 | 3 |

TABLE 3-continued

Peppermint chewing gum prepared with different softening ingredients

| Chewing gum | Gum base | Added ingredients: | Sensory evaluation | | | | |
|---|---|---|---|---|---|---|---|
| | | | Elastic | Softness 1 | Softness 2 | Volume | Creak |
| 1032 | 106 | 4% fat | 2 | 1 | 3 | 3 | 3 |
| 1033 | 106 | 5% fat | 2 | 1 | 3 | 3 | 3 |
| 1034 | 106 | 3% wax 1% lecithin | 3 | 3 | 3 | 3 | 1 |
| 1035 | 106 | 3% wax 2% lecithin | 3 | 3 | 4 | 4 | 1 |
| 1036 | 106 | 3% wax 3% glycerol | 3 | 2 | 3 | 3 | 0 |
| 1037 | 106 | 3% wax 1% triacetine | 3 | 2 | 3 | 3 | 0 |
| 1038 | 106 | 3% wax 1% lecithin 1% glycerol 1% triacetine | 3 | 3 | 4 | 3 | 0 |
| 1039 | 106[1] | 3% wax | 2 | 1 | 3 | 2 | 0 |
| 1040 | 106 | 12% talc 1% triacetine | 2 | 1 | 4 | 2 | 4 |
| 1041 | 106 | 12% talc 5% glycerol | 2 | 2 | 4 | 2 | 4 |
| 1042 | 106 | 12% talc 3% lecithin | 2 | 2 | 4 | 2 | 2 |
| 1043 | 106 | 12% talc 4% wax | 2 | 2 | 4 | 2 | 0 |
| 1044 | 106 | 12% talc 5% mono-di | 2 | 1 | 4 | 3 | 0 |
| 1045 | 106 | 12% talc 1% triacetine 1% glycerol 1% lecithin | 3 | 2 | 4 | 3 | 3 |
| 1046 | 106 | 12% talc 4% fat | 3 | 1 | 3 | 3 | 3 |
| 1047 | 1715 | std gumbase A | 4 | 3 | 4 | 4 | 0 |
| 1048 | 1706 | std gumbase B | 3 | 2 | 3 | 4 | 0 |
| 1049 | 1707 | std gumbase C | 4 | 1 | 3 | 3 | 0 |
| 1050 | 1705 | std gumbase D | 3 | 1 | 2 | 2 | 0 |

[1]30% talcum, 70% 106

The chewing gum products are prepared as follows:

The gumbase is added to a mixing kettle provided with mixing means like e.g. horizontally placed Z-shaped arms. The kettle had been preheated for 15 minutes to a temperature of about 60-80° C. or the chewing gum is made in one step, immediately after preparation of gumbase in the same mixer were the gum base and kettle has a temperature of about 60-80° C.

Mint Formulation:

One third portion of the sorbitol is added together with the gum base and mixed for 1-2 minutes. Another one third portion of the sorbitol and lycasin are then added to the kettle and mixed for 2 minutes. With chewing gum formulations including softener, the softener is usually added together with lycasin. The remaining one third portion of sorbitol, peppermint and menthol are added and mixed for 2 minutes. Then aspartame and acesulfame are added to the kettle and mixed for 3 minutes. Xylitol is added and mixed for 3 minutes. The resulting gum mixture is then discharged and e.g. transferred to a pan at temperature of 40-48° C. The gum is then rolled and scored into cores, sticks, balls, cubes, and any other desired shape, optionally followed by coating and polishing processes prior to packaging.

EXAMPLE 7

An experiment was set up in order to test if blend of three polymers (105) has a closer reological match, to conventional gum base (101) compared with the gumbase based only on one polymer (102, 103 and 104).

Accordingly, the following Theological parameters were measured using a rheometer, type AR1000 from TA Instruments. The oscillation measurement is performed at a stress within the linear viscoelastic region and a temperature of 130° C. with a parallel plate system (d=2.0 cm, hatched). G', and tan delta vs. shear rate.

Figure 2:
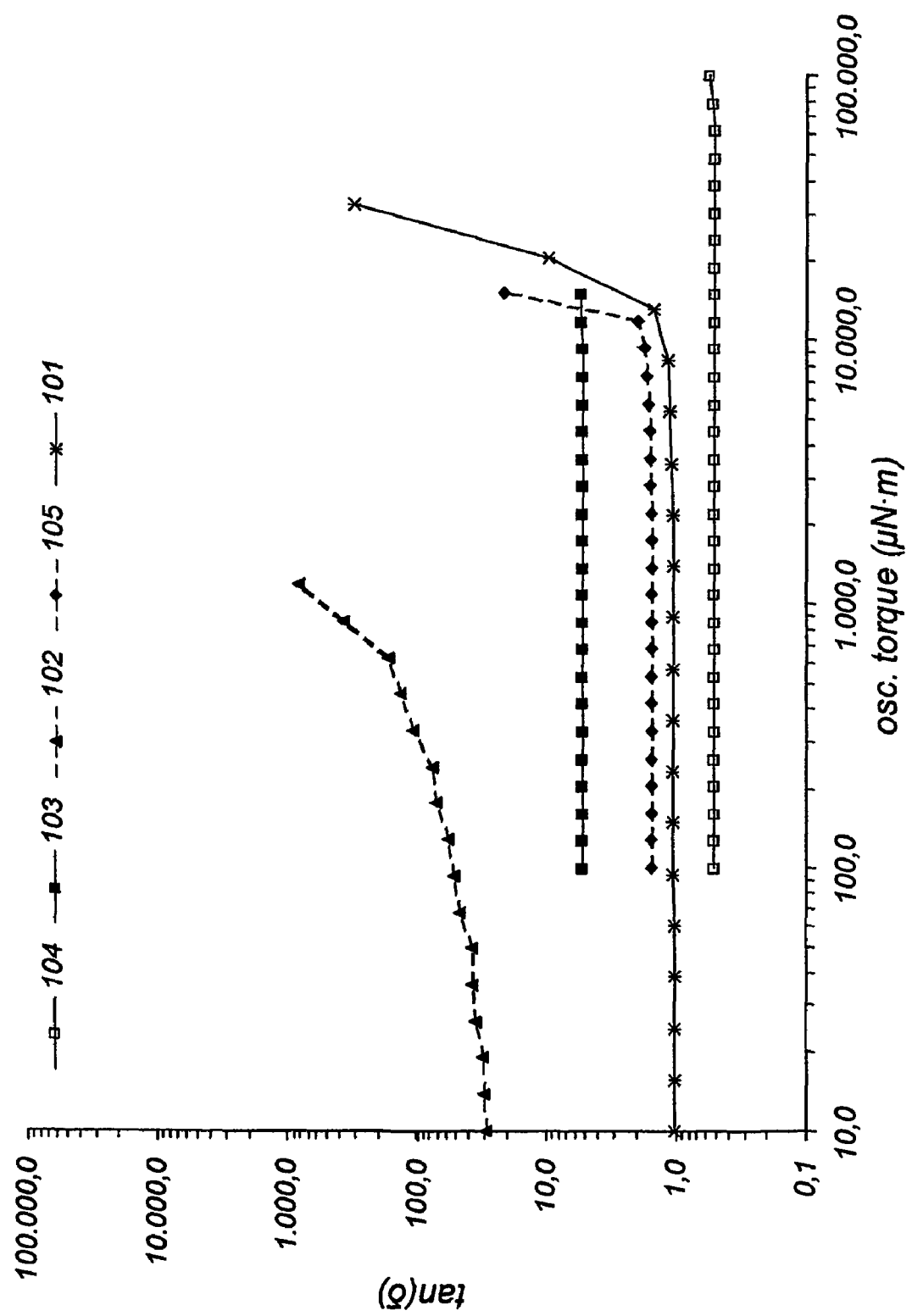

The results are summarized in FIGS. 1, 2 and as it appears, the elasticity tan (δ) and compactness (G') of standard gum base (101) and biodegradable gum base (105) are similar. The rheology of pure polymers (102, 103 and 104) showed different elasticity (tan (δ)) compared with 101 and 105.

EXAMPLE 8

Chewing Profile

An experiment was set up in order to test the corresponding chewing gum samples to the gum bases described in EXAMPLE 7, prepared and described in EXAMPLE 6. In order to test the chewing profile of the chewing gum samples containing the gum bases with pure polymers (1002-1004), polymer blend (1005) and std (1001). The gum centers were chewed in a chewing machine (CF Jansson). The chewing frequency was set to 1 Hz, a pH buffer was used as saliva and the temperature was set at 37° C. The chewing time was set to 30 seconds, 60 seconds and 120 seconds. After chewing, the chewed cud was measured on a rheometer, described in EXAMPLE 7 as oscillation measurements at temperature of 37° C. The results from these measurements can be seen on FIGS. 3 (30 seconds), 4 (60 seconds) and 5 (120 seconds) wherein the storage modulus (G') versus shear rate is depicted at different chewing times illustrating the texture changes during chewing.

Figure 3:
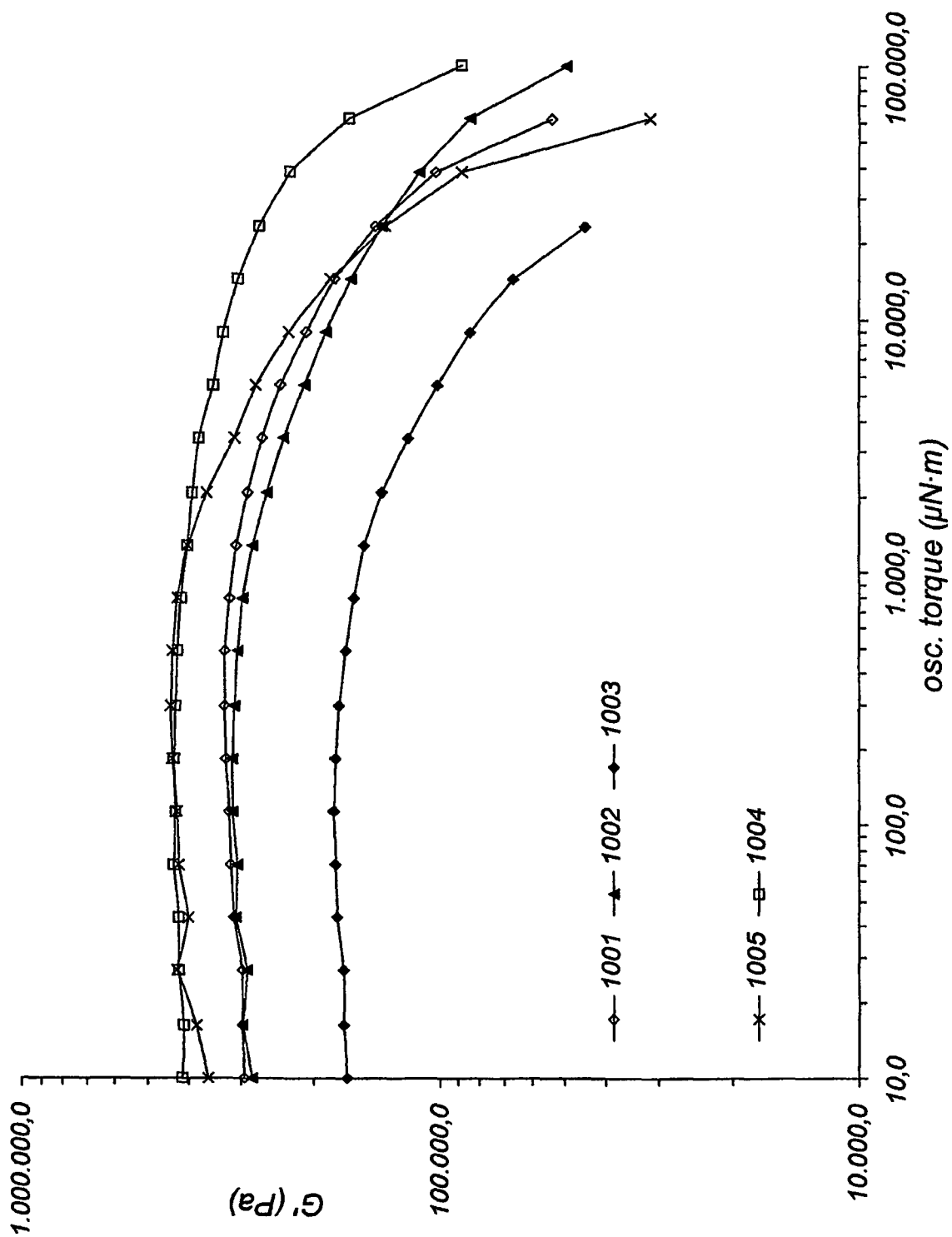
Figure 4:
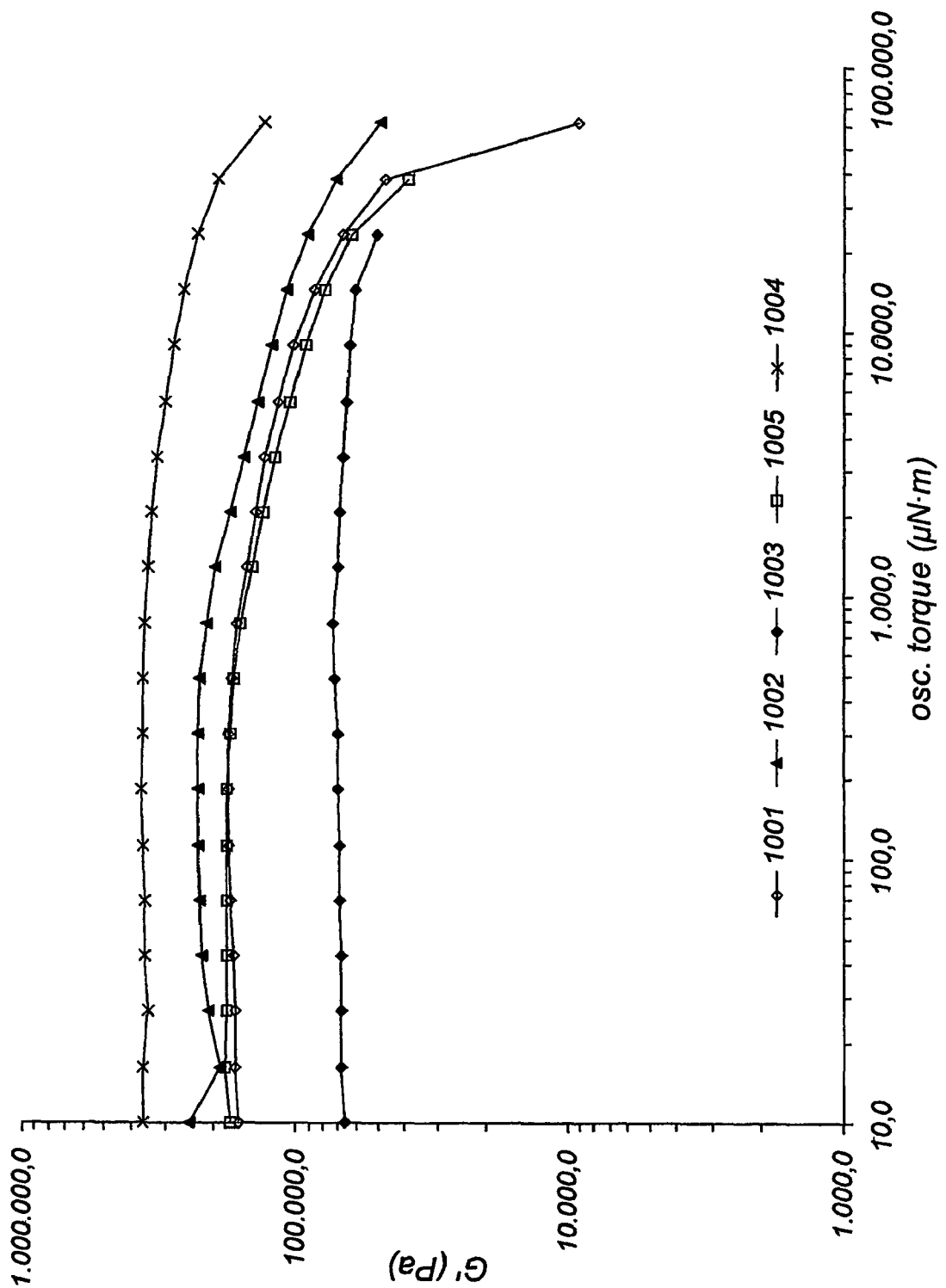
Figure 5:
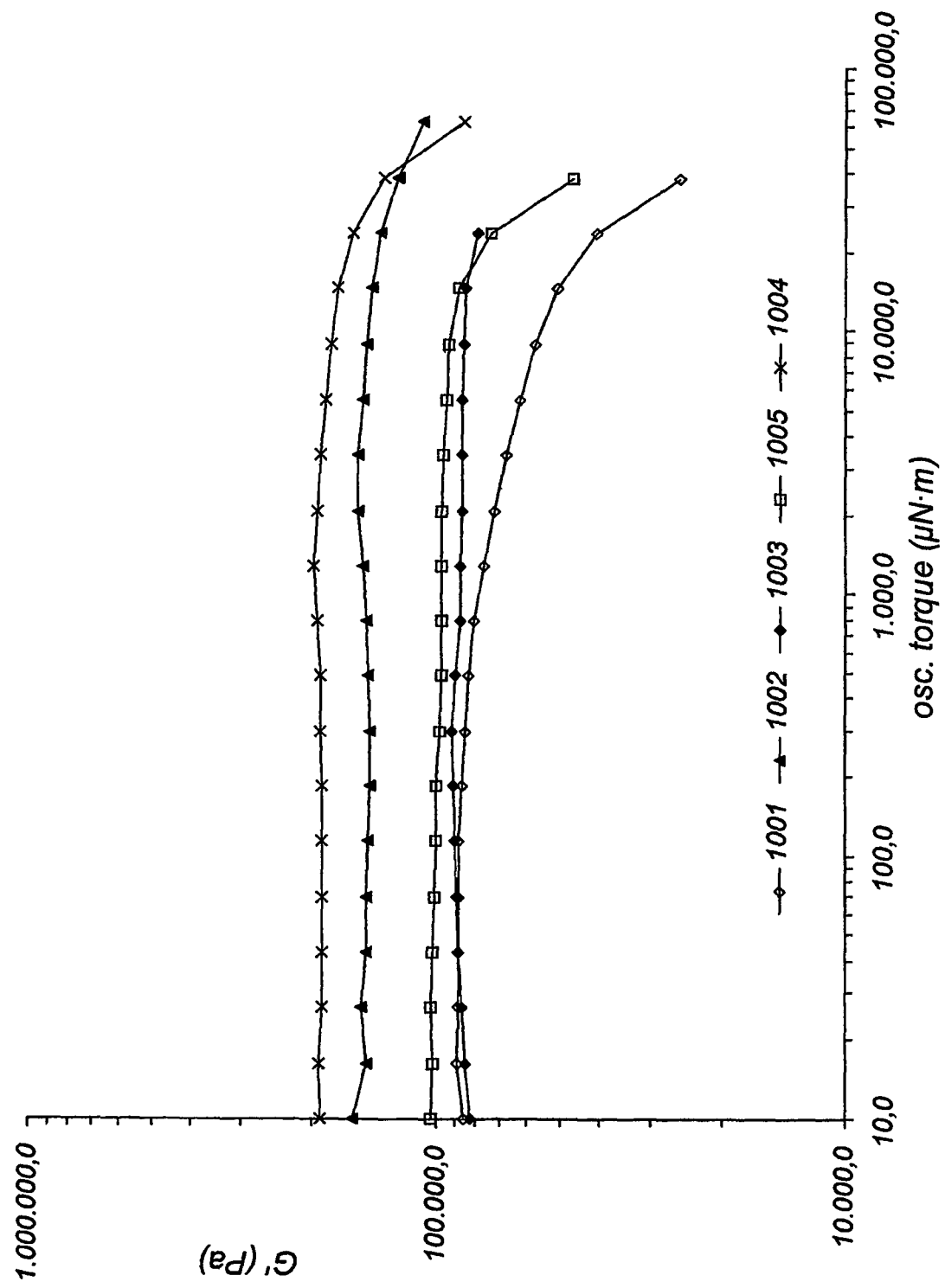
Figure 6:
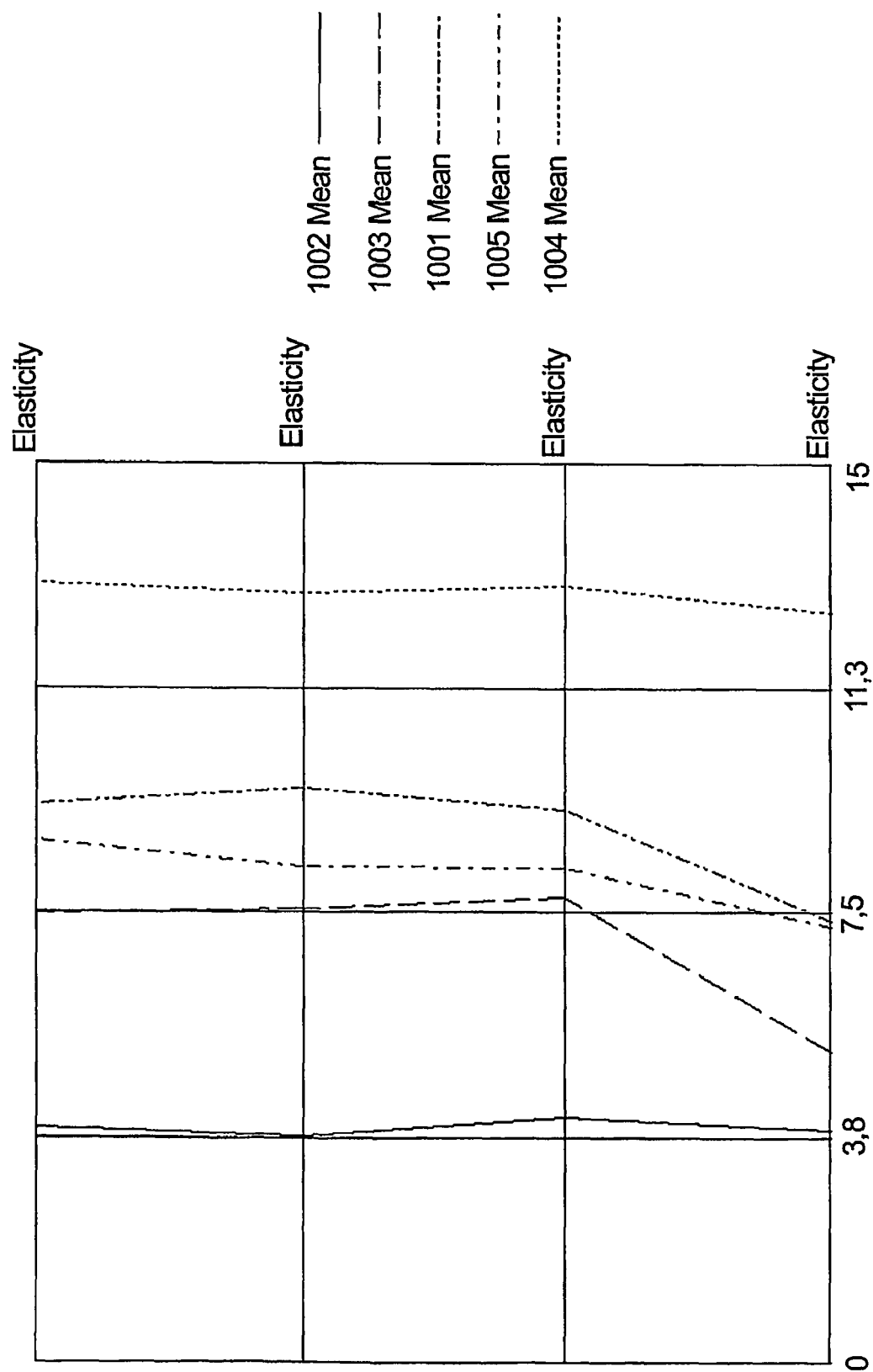
FIG. 6 to 9 illustrate sensory texture profile of the chewing gum according to the invention.
Figure 7:
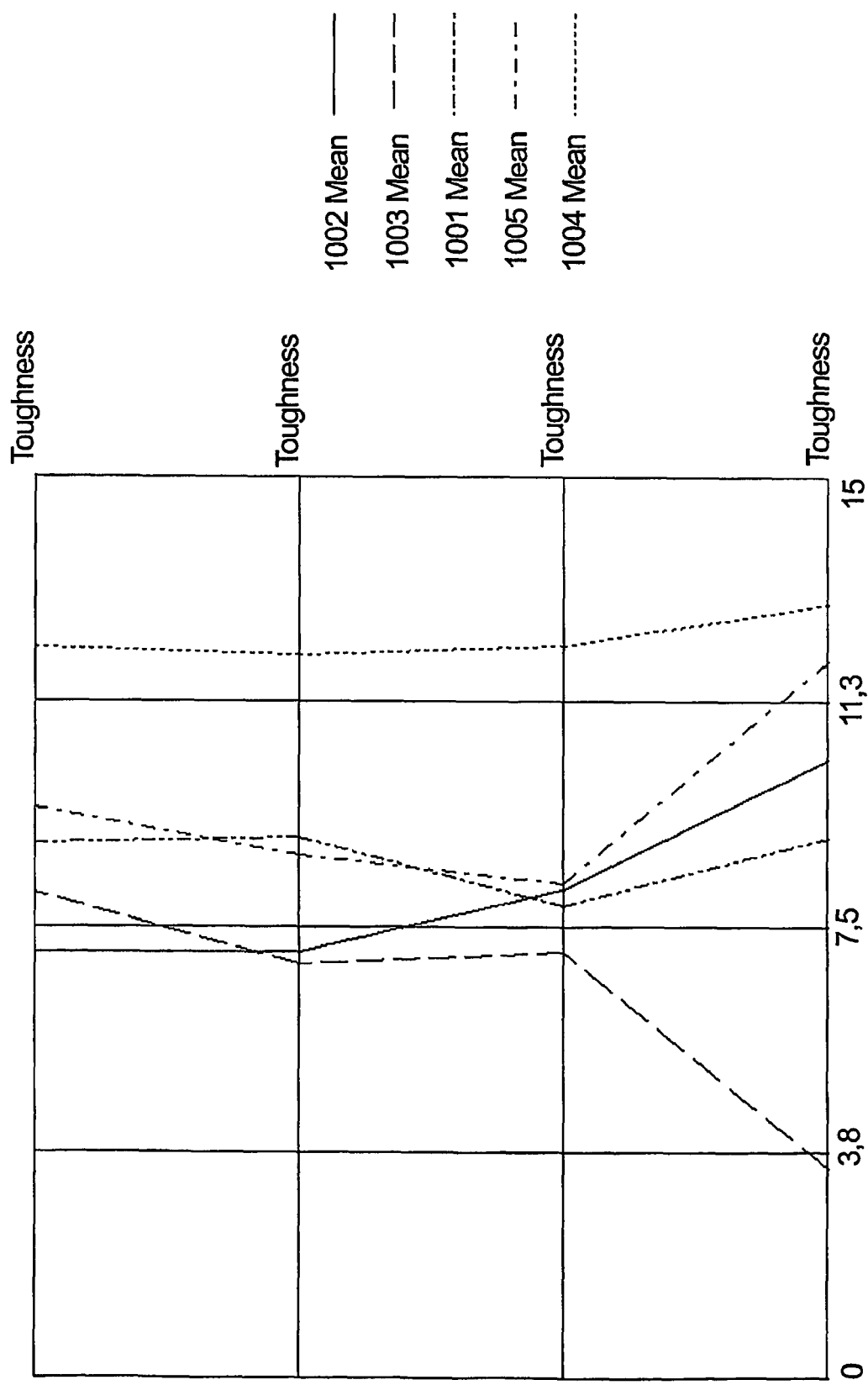
Figure 8:
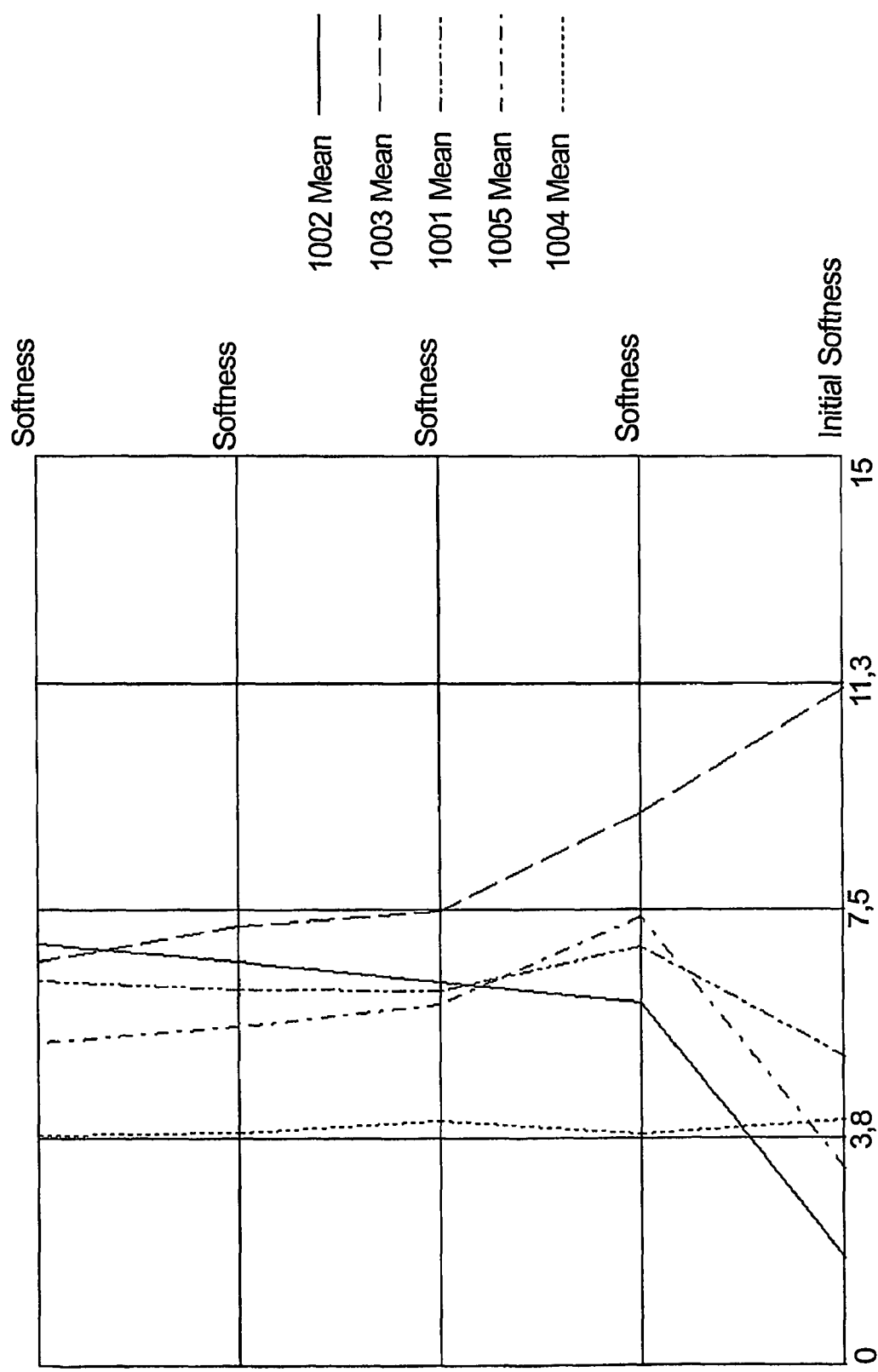
Figure 9:
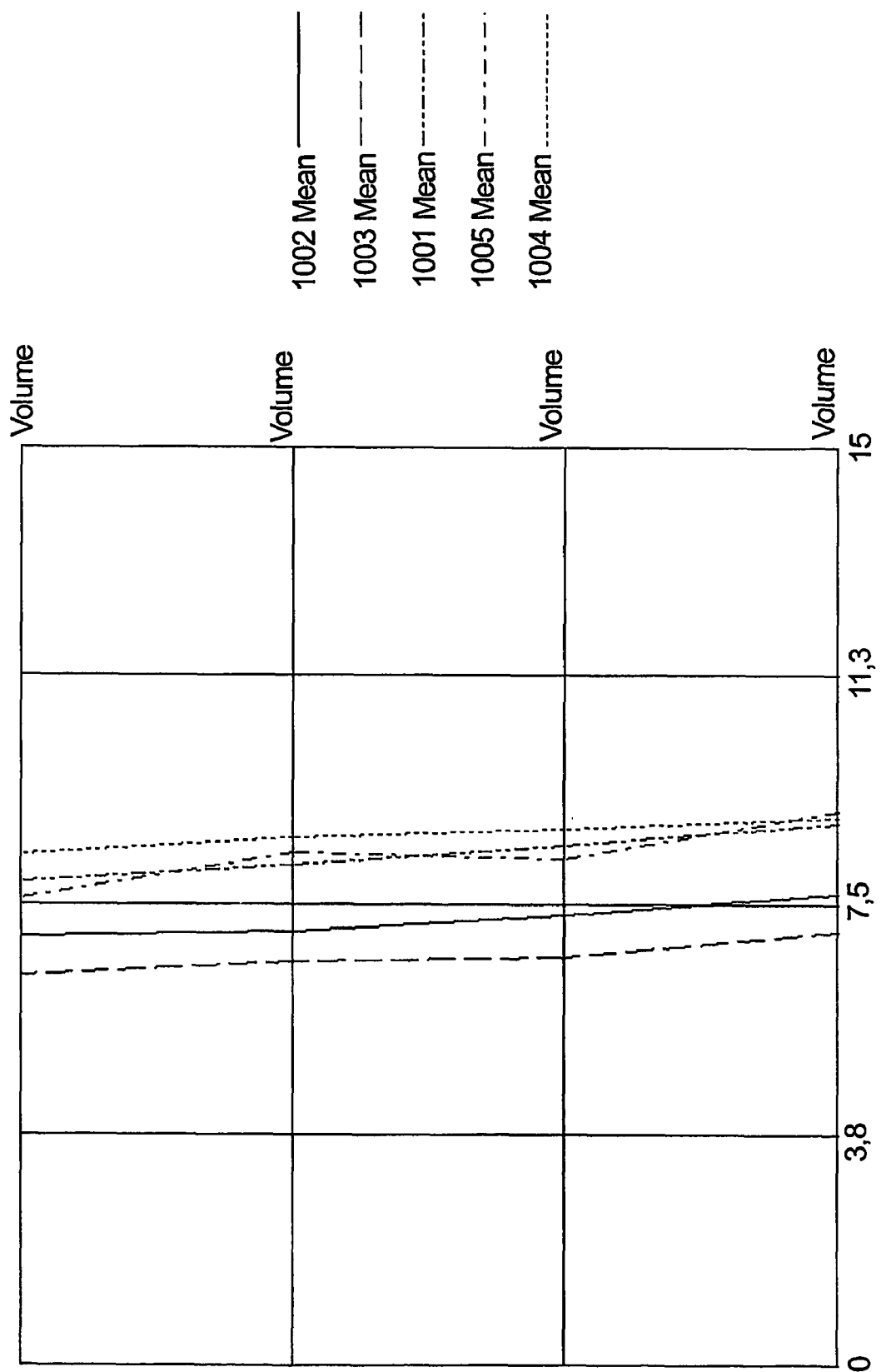

From FIGS. 3, 4 and 5 it can be seen that the two chewing gum formulations containing polymer blends, biodegradable (1005) and standard (1001) are close in all three phases, meaning the texture profile of the two products are similar. The chewing gum formulation containing pure LMWE elastomers (1003) is close to standard after 120 seconds but different after 30 and 60 seconds. Chewing gum 1002 containing pure resin is close to the standard at 30 seconds but different after 60 and 120 seconds The above Theological results confirm the fact, that chewing gum containing gum bases made with right combination of different polymers has texture changes closer to conventional gum bases and chewing gum, as compared to chewing gum containing gum bases only consisting of one single polymer.

EXAMPLE 9

Sensory Texture Profile Analyses

The five chewing gum samples were tested by serving them to the sensory panellists in tasting booths made in accordance with ISO 8598 standards at room temperature in 40 ml tasteless plastic cups with randomized 3-figure codes. Test samples were evaluated after chewing for 0-1 minutes (initial phase), 1-2 minutes (intermediate phase 1), 2-3 minutes (intermediate phase 2) and 3-4 minutes (end phase), respectively. Between each sample tested, the panellists were allowed a break of 3 minutes. Every test is repeated.

The following texture parameters were assessed: softness, toughness, elasticity, and volume. For each of these parameters, the panellists were required to provide their assessments according to an arbitrary scale of 0-15. The data obtained were processed using a FIZZ computer program (French Bio System) and the results were transformed to sensory profile diagrams as shown in FIG. 6-9.

As it can be seen from FIG. 6-9, the sample containing biodegradable polymerblend (1005) and the sample containing conventional standard gum base (1001) has clearly similar texture profiles in all parameters. Where the chewing gum formulation containing pure polymers (1002-1004) are clearly different from the two chewing gum samples containing polymer blends.

The results obtained from the sensory profile are confirming the Theological data obtained in the above EXAMPLE 8

EXAMPLE 10

In table 3 a number of formulations are evaluated by a panel according to elasticity, initial softness, softness, volume and creakiness The scale used for the evaluation was as follows: 1 being the lowest rating and 5 being the highest rating.

Many different biodegradable chewing gum formulations are made, containing gum base 106, which consist of three different bio polymers, as described in EXAMPLE 5. Conventional chewing gums, containing standard gum base (101) are made for comparison between the bio and standard system.

As it can be seen from table 3, using a combination of different polymers gives the possibility of adjusting the texture into desired properties. Different combinations of ingredients e.g. softeners, emulsifiers and fillers gives different texture profiles.

All the evaluated biodegradable chewing gum formulations containing gum base 106 showed improved low stickiness to dental surfaces compared with conventional chewing gum formulations.

Two biodegradable chewing gums, a simple system (1006) and adjusted biodegradable formulations (1038) were compared with 4 conventionally chewing gum systems (1047-1050). The rheology properties was measured on chewed gum for 60 seconds, as described in EXAMPLE 8

Figure 10:
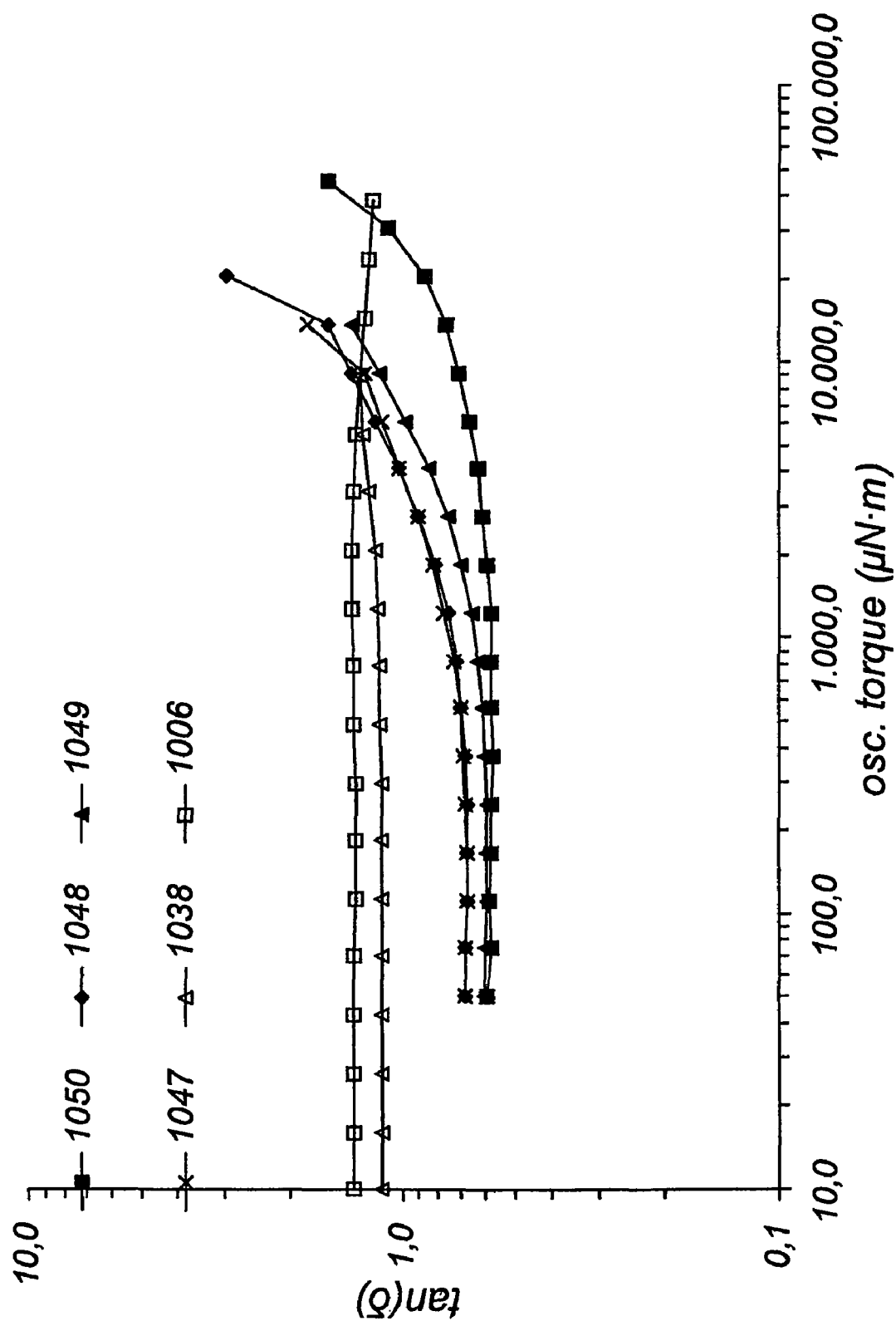
FIG. 10 illustrates the adjustment of the chewing gum according to the invention by means of rheological measurements, and where
Figure 11:
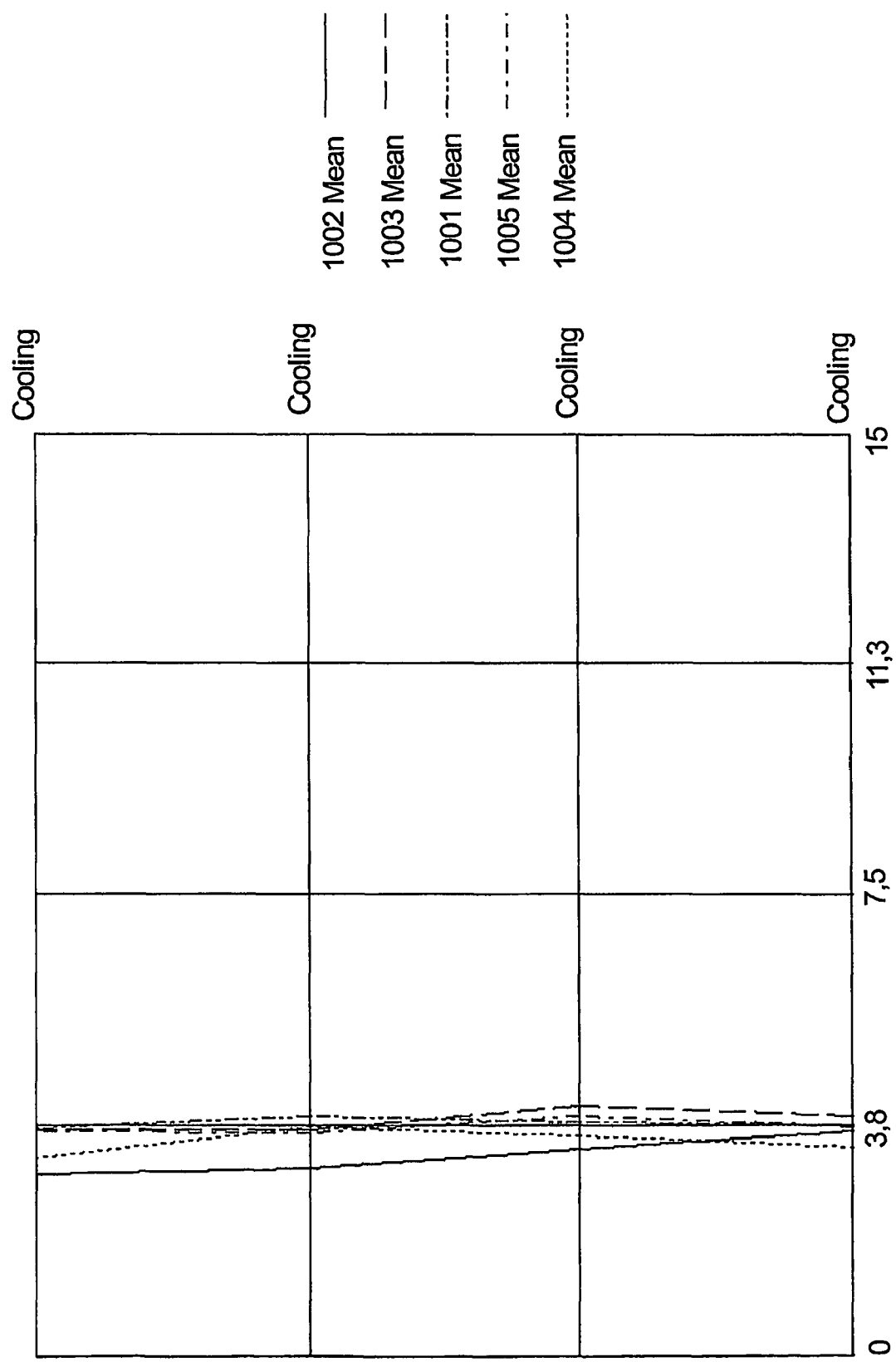
FIG. 11 to 14 illustrate the evaluation of release of the following taste parameters; peppermint, sweetness, flavor intensity and cooling.

As it can be seen from FIG. 10, it is possible to adjust the biodegradable formulation from 1006 to 1038, in order to get a closer match to the standard chewing gum formulations. The curve of 1038 is also changing from linear to a slightly increasing curve at higher shear rate similar to the standard formulations.

EXAMPLE 11

Glass Transition Temperature Tg

The glass transition temperature of all polymers and combination thereof was measured using a DSC instrument (heating rate 10° C./min).

TABLE 4

| glass transition temperatures | |
| --- | --- |
| Sample | Tg, ° C. |
| Example 1 | 26 |
| Example 2 | −75 |
| Example 3 | −71 |
| Gumbase 106 | 20 and −70 |

Table 4 shows Tg for all three polymers used in gumbase formulation 106. The blended gumbase shows two separate glass transistion temperatures located close to the Tg of the elastomers (EXAMPLE 2 and 3) and of the resin (EXAMPLE 1). The incompatibility of all three polymers is evident from the occurrence of two separately Tg's.

EXAMPLE 12

Sensory Flavor Profile Analyses

Five chewing gum samples (were tested according to the sensory method described in EXAMPLE 9.

FIGS. 11-14 are illustrating the evaluation of release of the following taste parameters; peppermint, sweetness, flavor intensity and cooling.

FIG. 11:

No differences between samples 1001 to 1005 can be observed. Both the conventional chewing gum and the partly biodegradable chewing gum have very uniform cooling as a function of chewing gum.

FIG. 12:

Initially 1002 and 1003 are higher in flavor intensity compared to 1001, 1004 and 1005. 1002 and 1003 being the low molecular weight polymers i.e. having lower viscosity resulting in faster flavor release due the increased mobility of the flavor components in the compound 1004 being the high molecular weight polymer i.e. having higher viscosity than all the other examples are having the slowest release. After 2 minutes of chewing gum the picture is changing as the flavor in the low molecular polymer is released from the system and the high molecular weight polymer take the lead as it still has retained flavor for release in the system. The 1005 compared to 1001 is having a higher release at all chewing times (except up to 1 minute of chewing) indicating a synergetic effect of mixing all three biodegradable polymers.

Figure 12:
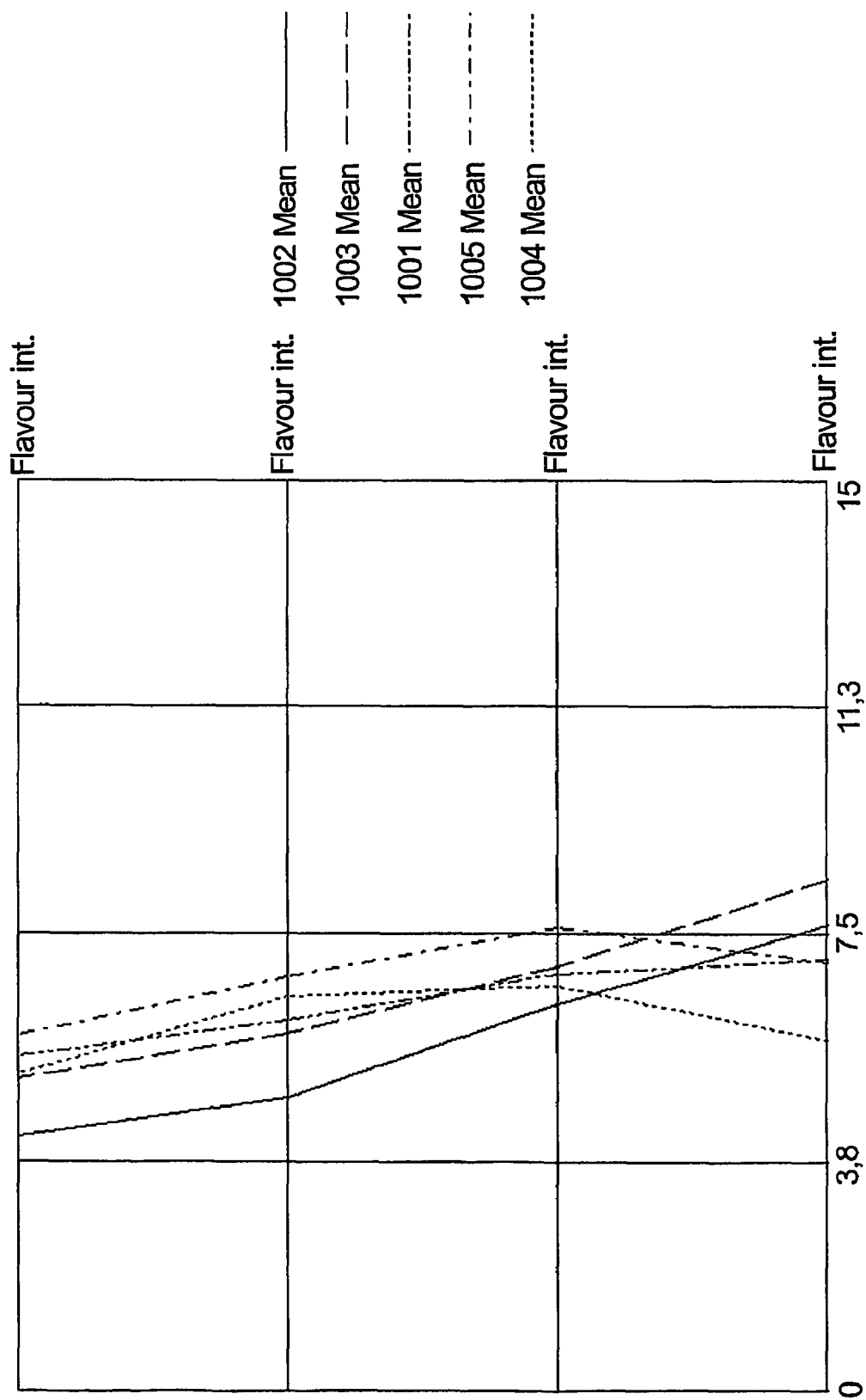
Figure 13:
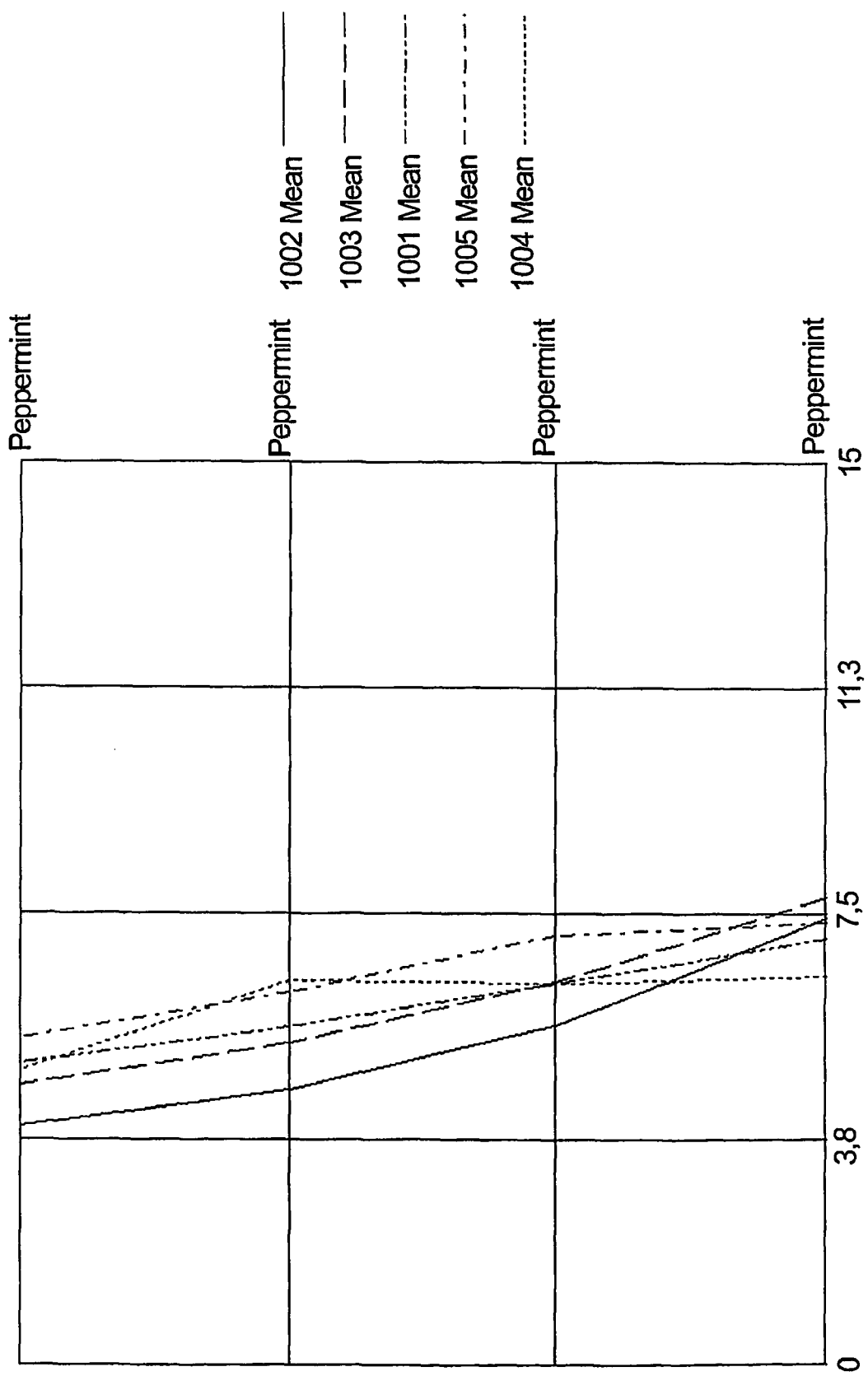
Figure 14:
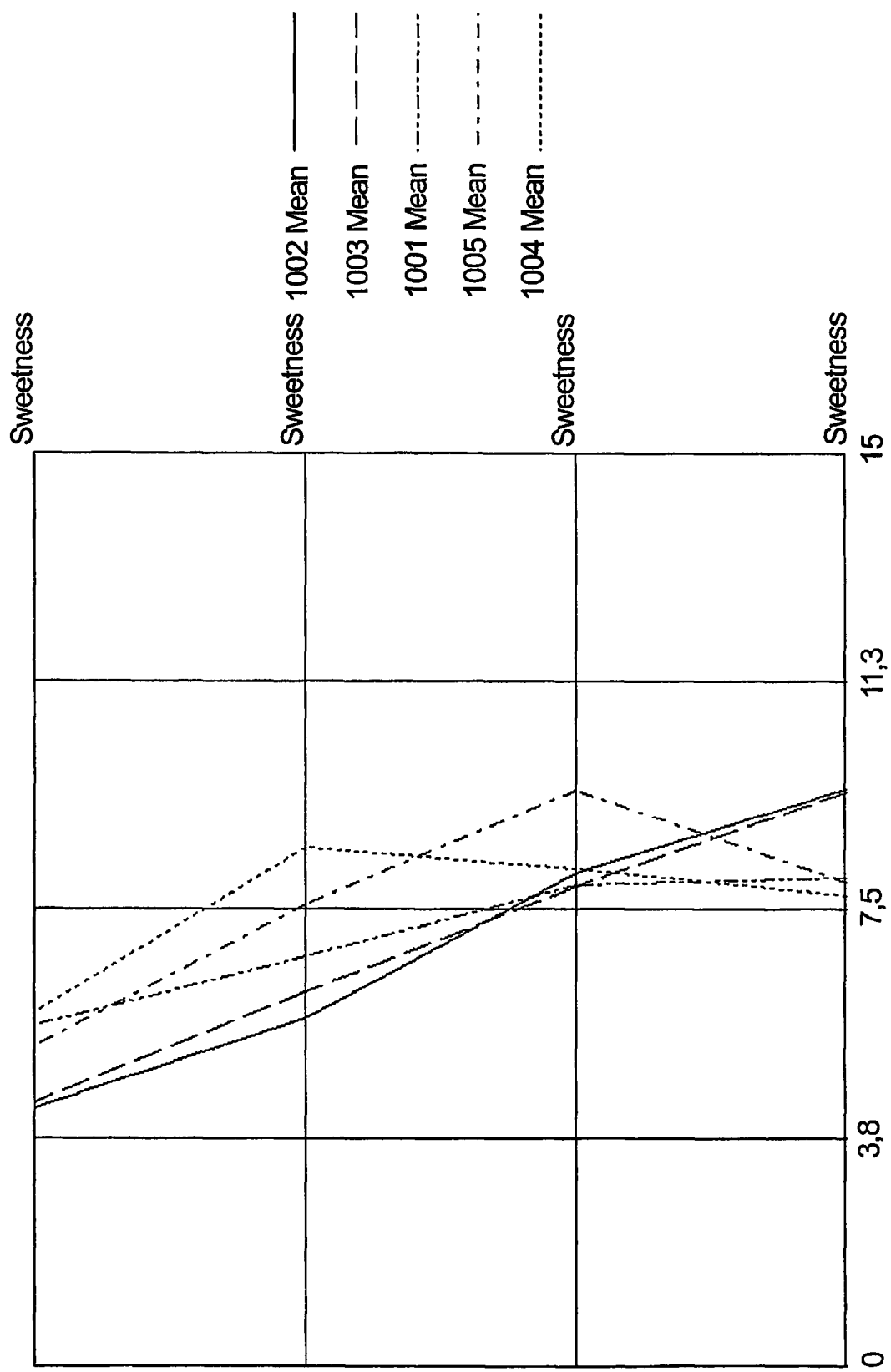

FIG. 13:

Release of peppermint follows the flavor release profiles described according to FIG. 12.

FIG. 14:

The sweetness release profile compares in general with the release of flavor intensity and peppermint. However 1004 is having the peak value later than the other examples, which is due to the very high viscosity of this sample making it difficult in the initial phase to incorporate the saliva into the gum base. However due to the more hydrophilic nature of the biodegradable polymers compared to the conventional gum base polymers, then the saliva when the polymer is softened, incorporates very fast resulting in high release of the sweetener.

1002 and 1003 being the low viscosity polymers are showing instant high release of sweetener resulting from the initial softness and the hydrophilic nature of the polymers—hence a very low sweetness release after 2 minutes of chewing as all of the sweetener is released from the system.

As the uptake of saliva into the biodegradable gum base is faster compared to the conventional gum base polymer being more hydrophobic the release of sweeteners in biodegradable systems are faster and more intense.

The invention claimed is:

1. Chewing gum comprising at least two different biodegradable polymers,
   wherein said at least two different biodegradable polymers have a different glass transition temperature Tg,
   wherein at least one of the biodegradable polymers has a glass transition of at least +1° C.,
   wherein at least one of the at least two different biodegradable polymers has a glass transition temperature of less than 0° C., and
   wherein the difference in molecular weight between the at least two different biodegradable polymers is at least 1000 g/mol Mn.

2. Chewing gum according to claim 1,
   wherein the at least two different polymers are hydrophilic.

3. Chewing gum according to claim 1,
   wherein the difference in molecular weight between the at least two different polymers is at least 50000 g/mol Mn.

4. Chewing gum according to claim 1,
   wherein at least one of said at least two different biodegradable polymers comprises a biodegradable elastomer and
   at least one of said at least two different biodegradable polymers comprises a biodegradable plasticizer, said biodegradable plasticizer comprising at least one biodegradable polymer.

5. Chewing gum according to claim 4,
   wherein the molecular weight of said biodegradable plasticizer is in the range of 500-19,000 g/mol Mn.

6. Chewing gum according to claim 4, wherein said at least two different biodegradable polymers have different glass transition temperatures Tg.

7. Chewing gum according to claim 1,
   wherein at least one of the biodegradable polymers, has a glass transition of at least +10° C.

8. Chewing gum according to claim 1,
   wherein at least one of the biodegradable polymers, has a glass transition of at least +20° C.

9. Chewing gum according to claim 1,
   wherein at least one of the biodegradable polymers comprises a biodegradable elastomer.

10. Chewing gum according to claim 9,
    wherein the molecular weight of said biodegradable elastomer is in the range of 10000-1000000 g/mol Mn.

11. Chewing gum according to claim 1,
    wherein at least one of the at least two different biodegradable polymers has a glass transition temperature of less than −30° C.

12. Chewing gum according to claim 1,
    wherein the resulting chewing gum has at least two different glass transition temperatures Tg.

13. Chewing gum according to claim 1,
    wherein the chewing gum comprises at least one biodegradable elastomer having a glass transition temperature Tg below 0° C. and at least one biodegradable plasticizer having a glass transition temperature Tg exceeding 0° C.

14. Chewing gum according to claim 13,
    wherein the at least one plasticizer comprises a biodegradable polymer obtained by polymerization of one or more cyclic esters.

15. Chewing gum according to claim 13,
    wherein the at least one elastomer comprises a biodegradable polymer obtained by polymerization of one or more cyclic esters.

16. Chewing gum according to claim 13,
    wherein the at least one elastomer comprises edible polyesters.

17. Chewing gum according to claim 13,
    wherein the at least one elastomer comprises edible polyesters or polyhydroxyalkanoates.

18. Chewing gum according to claim 1,
    wherein said chewing gum comprises at least one biodegradable elastomer in the amount of about 0.5 to about 70% wt of the chewing gum, at least one biodegradable plasticizer in the amount of about 0.5 to about 70% wt of the chewing gum and at least one chewing gum ingredient chosen from the group consisting of softeners, sweeteners, flavoring agents, active ingredients and fillers in the amount of about 2 to about 80% wt of the chewing gum.

19. Chewing gum according to claim 1,
    wherein the at least one biodegradable polymer comprises at least 25% of the chewing gum polymers.

20. Chewing gum according to claim 1,
    wherein all the biodegradable polymers comprised in the chewing gum comprise at least 25% of the chewing gum polymers.

21. Chewing gum according to claim 1,
    wherein all the biodegradable polymers comprised in the chewing gum comprise at least 80% of the chewing gum polymers.

22. Chewing gum according to claim 1,
    wherein the chewing gum is substantially free of non-biodegradable polymers.

23. Chewing gum according to claim 1,
    wherein the chewing gum is free of non-biodegradable polymers.

24. Chewing gum according to claim 18,
    wherein said chewing gum ingredients comprise flavoring agents.

25. Chewing gum according to claim 24,
    wherein said flavoring agents comprise natural and synthetic flavorings in the form of natural vegetable components, essential oils, essences, extracts, powders, including acids or other substances capable of affecting the taste profile.

26. Chewing gum according to claim 24,
wherein said chewing gum comprises flavoring agents in the amount of 0.01 to about 30 wt %, said percentage being based on the total weight of the chewing gum.

27. Chewing gum according to claim 24,
wherein said chewing gum comprises flavoring agents in the amount of 0.2 to about 4 wt %, said percentage being based on the total weight of the chewing gum.

28. Chewing gum according to claim 24,
wherein said flavoring agent comprises water soluble ingredients.

29. Chewing gum according to claim 28,
wherein said water soluble flavoring agent comprises acids.

30. Chewing gum according to claim 24,
wherein said flavoring agent comprises water insoluble ingredients.

31. Chewing gum according to claim 18,
wherein said chewing gum ingredients comprise sweeteners.

32. Chewing gum according to claim 31,
wherein said sweetener comprises bulk sweeteners.

33. Chewing gum according to claim 32,
wherein the chewing gum comprises bulk sweeteners in the amount of about 5 to about 95% by weight of the chewing gum.

34. Chewing gum according to claim 31,
wherein said sweetener comprises high intensity sweeteners.

35. Chewing gum according to claim 34,
wherein the high intensity sweeteners comprise sucralose, aspartame, salts of acesulfame, alitame, saccharin and its salts, cyclamic acid and its salts, glycyrrhizin, dihydrochalcones, thaumatin, monellin, stevioside, alone or in combination.

36. Chewing gum according to claim 34,
wherein the chewing gum comprises high intensity sweeteners in the amount of about 0 to about 1% by weight of the chewing gum.

37. Chewing gum according to claim 1,
wherein the chewing gum comprises at least one softener.

38. Chewing gum according to claim 37,
wherein the at least one softener comprises tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids, stearic acid, palmitic acid, oleic acid, linoleic acid, waxes, polyglycol esters, or mixtures thereof.

39. Chewing gum according to claim 37,
wherein the chewing gum comprises softeners in the amount of about 0 to about 18% by weight of the chewing gum.

40. Chewing gum according to claim 18,
wherein said chewing gum ingredients comprise active ingredients.

41. Chewing gum according to claim 40, said active ingredients being selected from the group consisting of: Acetaminophen, Acetylsalicylic acid, Buprenorphine, Bromhexin, Celcoxib, Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Rofecoxib, Tenoxicam, Tramadol, Valdecoxib, Calciumcarbonat, Magaldrate, Disulfiram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon. Chloride, Benzeth. Chloride, Cetylpyrid. Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Cialis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminium salts, Calcium salts, Ferro salts, Silver salts, Zinc-salte, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminiumaminoacetat, Cimetidine, Esomeprazole, Famotidine, Lansoprazole, Magnesiumoxide, Nizatide and/or Ratinidine or derivates and mixtures thereof.

42. Chewing gum according to claim 18,
wherein the chewing gum is substantially free of non-biodegradable polymers.

43. Chewing gum according to claim 1,
wherein one of the at least two biodegradable polymers is a polymer obtained by polymerization of one or more cyclic esters wherein the cyclic esters are selected from the group consisting of glycolides, lactides, lactones, cyclic carbonates and mixtures thereof.

44. Chewing gum according to claim 43,
wherein said lactones are chosen from the group consisting of ε-caprolactone, δ-valerolactone, γ-butyrolactone, β-propiolactone, and mixtures thereof; wherein the lactone is optionally substituted with one or more alkyl or aryl substituents at any non-carbonyl carbon atoms along the ring, including compounds in which two substituents are contained on the same carbon atom.

45. Chewing gum according to claim 43,
wherein the carbonate monomer is selected from the group consisting of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4, 6dimethyl-1, 3-propylene carbonate, 2,2-dimethyl trimethylene carbonate, 1,3-dioxepan-2-one and mixtures thereof.

46. Chewing gum according to claim 43,
wherein cyclic ester polymers and their copolymers resulting from the polymerization of cyclic ester monomers are selected from the group consisting of poly (L-lactide); poly (D-lactide); poly (D, L-lactide); poly (meso-lactide); poly (glycolide); poly (trimethylenecarbonate); poly (epsilon-caprolactone); poly (L lactide-co-D, L-lactide); poly (L-lactide-co-meso-lactide); poly (L-lactide co-glycolide); poly (L-lactide-co-trimethylenecarbonate); poly (L-lactide co-epsilon-caprolactone); poly (D, L-lactide-co-meso-lactide); poly (D, L lactide-co-glycolide); poly (D, L-lactide-co-trimethylenecarbonate); poly (D, L-lactide-co-epsilon-caprolactone); poly (meso-lactide-co glycolide); poly (meso-lactide-co-trimethylenecarbonate); poly (meso lactide-co-epsilon-caprolactone); poly (glycolide-cotrimethylenecarbonate) and poly (glycolide-co-epsilon-caprolactone).

47. Chewing gum according to claim 1,
wherein the chewing gum comprises filler.

48. Chewing gum according to claim 47,
wherein the chewing gum comprises filler in an amount of about 0 to about 50% by weight of the chewing gum.

49. Chewing gum according to claim 1,
wherein the chewing gum comprises at least one coloring agent.

50. Chewing gum according to claim 1,
wherein the chewing gum is coated with an outer coating.

51. Chewing gum according to claim 50,
wherein the outer coating is a hard coating.

52. Chewing gum according to claim 51,
wherein the hard coating is a coating selected from the group consisting of a sugar coating, a sugarless coating, and a combination thereof.

53. Chewing gum according to claim 51,
wherein the hard coating comprises 50 to 100% by weight of a polyol selected from the group consisting of sorbitol, maltitol, mannitol, xylitol, erythritol, lactitol and isomalt.

54. Chewing gum according to claim 50,
wherein the outer coating is an edible film comprising at least one component selected from the group consisting of an edible film-forming agent and a wax.

55. Chewing gum according to claim 54,
wherein the film-forming agent is selected from the group consisting of a cellulose derivative, a modified starch, a dextrin, gelatine, shellac, gum arabic, zein, a vegetable gum, a synthetic polymer and any combination thereof.

56. Chewing gum according to claim 50,
wherein the outer coating comprises at least one additive component selected from the group consisting of a binding agent, a moisture absorbing component, a film forming agent, a dispersing agent, an antisticking component, a bulking agent, a flavoring agent, a coloring agent, a pharmaceutically or cosmetically active component, a lipid component, a wax component, a sugar, an acid and an agent capable of accelerating the after-chewing degradation of the degradable polymer.

57. Chewing gum according to claim 50,
wherein the outer coating is a soft coating.

58. Chewing gum according to claim 57,
wherein the soft coating comprises a sugar free coating agent.

59. Chewing gum according to claim 1,
wherein said chewing gum comprises conventional chewing gum polymers or resins.

60. Chewing gum according to claim 1,
wherein the at least one biodegradable polymer comprises at least 5% of the chewing gum polymers.

61. Chewing gum according to claim 1,
wherein all the biodegradable polymers comprised in the chewing gum comprise at least 25% of the chewing gum polymers.

62. Chewing gum according to claim 1,
wherein all the biodegradable polymers comprised in the chewing gum comprise at least 80% of the chewing gum polymers.

* * * * *